(12) United States Patent
Gu et al.

(10) Patent No.: US 11,860,693 B2
(45) Date of Patent: Jan. 2, 2024

(54) ELECTRONIC APPARATUS INCLUDING DIGITIZER

(71) Applicant: Samsung Display Co., Ltd., Yongin-si (KR)

(72) Inventors: Dasom Gu, Asan-si (KR); Hirotsugu Kishimoto, Hwasung-si (KR); Chul Ho Jeong, Seoul (KR); Jeongil Yoo, Seoul (KR); Jang Doo Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/862,913

(22) Filed: Jul. 12, 2022

(65) Prior Publication Data
US 2023/0076740 A1 Mar. 9, 2023

(30) Foreign Application Priority Data
Sep. 7, 2021 (KR) .................. 10-2021-0119317

(51) Int. Cl.
G06F 1/16 (2006.01)
G06F 3/044 (2006.01)

(52) U.S. Cl.
CPC .......... *G06F 1/1643* (2013.01); *G06F 1/1616* (2013.01); *G06F 3/0446* (2019.05)

(58) Field of Classification Search
CPC combination set(s) only.
See application file for complete search history.

(56) References Cited

U.S. PATENT DOCUMENTS

| | | | |
|---|---|---|---|
| 7,307,616 B2 | 12/2007 | Katsuhito et al. | |
| 7,812,268 B2 | 10/2010 | Ely | |
| 8,089,475 B2 | 1/2012 | Ito | |
| 9,857,845 B2* | 1/2018 | Hong | H10K 50/80 |
| 10,514,792 B2* | 12/2019 | Kim | G06F 3/04164 |
| 11,281,346 B2* | 3/2022 | Hirotsugu | G06F 3/0446 |
| 11,513,653 B2* | 11/2022 | Kishimoto | G06F 1/1616 |
| 11,552,264 B2* | 1/2023 | Kim | H10K 77/111 |

(Continued)

FOREIGN PATENT DOCUMENTS

| | | |
|---|---|---|
| KR | 1020170034998 A | 3/2017 |
| KR | 1020200132150 A | 11/2020 |
| KR | 1020210016258 A | 2/2021 |

*Primary Examiner* — Lisa Lea-Edmonds
(74) *Attorney, Agent, or Firm* — CANTOR COLBURN LLP

(57) ABSTRACT

An electronic apparatus includes a display layer including a folding area and non-folding areas, a digitizer disposed under the display layer and including first sensing coils, second sensing coils insulated from the first sensing coils, and data lines connected to the second sensing coils, and a support layer disposed under the digitizer, where openings are defined in a portion of the support layer overlapping the folding area. Each first sensing coil includes a long side extending in the first direction and a short side extending in the second direction, each second sensing coil includes a long side extending in the second direction and a short side extending in the first direction, and a width in the second direction of a portion of the data lines overlapping the folding area is greater than a width in the second direction of a portion of the data lines not overlapping the folding area.

20 Claims, 17 Drawing Sheets

(56) References Cited

U.S. PATENT DOCUMENTS

| | | | |
|---|---|---|---|
| 11,570,911 B2* | 1/2023 | Shin | G06F 1/1641 |
| 11,614,777 B2* | 3/2023 | Kishimoto | G06F 3/0412 |
| | | | 345/174 |
| 11,625,068 B2* | 4/2023 | Hwang | G06F 3/041 |
| | | | 361/679.01 |
| 11,698,704 B2* | 7/2023 | Yoo | H05K 9/0054 |
| | | | 345/174 |
| 2021/0034180 A1* | 2/2021 | Hirotsugu | G06F 3/046 |
| 2021/0271335 A1* | 9/2021 | Kishimoto | G06F 1/1616 |
| 2021/0397221 A1* | 12/2021 | Hwang | G06F 3/041 |
| 2022/0061169 A1* | 2/2022 | Shin | H05K 5/0017 |
| 2022/0075416 A1* | 3/2022 | Kishimoto | G06F 3/0412 |
| 2022/0086267 A1* | 3/2022 | Shin | H04M 1/0268 |
| 2022/0100234 A1* | 3/2022 | Kishimoto | H10K 77/111 |
| 2022/0199921 A1* | 6/2022 | Kim | H10K 59/40 |
| 2022/0374045 A1* | 11/2022 | Lee | G06F 1/1643 |
| 2022/0397934 A1* | 12/2022 | La | H10K 59/872 |
| 2022/0397935 A1* | 12/2022 | Yoo | G06F 1/1652 |
| 2022/0397972 A1* | 12/2022 | Yoo | G06F 3/046 |
| 2023/0030438 A1* | 2/2023 | Kim | G06F 1/1656 |
| 2023/0048565 A1* | 2/2023 | Kishimoto | G06F 1/1647 |
| 2023/0076740 A1* | 3/2023 | Gu | G06F 3/04164 |
| 2023/0156930 A1* | 5/2023 | Shin | G06F 3/046 |
| | | | 345/174 |

* cited by examiner

ELECTRONIC APPARATUS INCLUDING DIGITIZER

This application claims priority to Korean Patent Application No. 10-2021-0119317, filed on Sep. 7, 2021, and all the benefits accruing therefrom under 35 U.S.C. § 119, the content of which in its entirety is herein incorporated by reference.

BACKGROUND

1. Field

The disclosure relates to an electronic apparatus including a digitizer. More particularly, the disclosure relates to an electronic apparatus with improved reliability.

2. Description of the Related Art

In the information society, an electronic apparatus including a display device is becoming increasingly important as a medium for providing visual information. In such an electronic apparatus, the display device may include a liquid crystal display ("LCD"), a plasma display panel ("PDP"), an organic light emitting display ("OLED"), a field effect display ("FED"), or an electrophoretic display ("EPD").

The electronic apparatus is activated in response to electrical signals applied thereto. The electronic apparatus includes a sensor that senses an external input applied thereto from an outside of a display layer that displays an image.

The electronic apparatus may include various electrode patterns to be activated by the electrical signals. Areas, in which the electrode patterns are activated, may display information or respond to the external signal.

SUMMARY

Embodiments of the disclosure provides an electronic apparatus including a digitizer, which senses an external input, with improved folding characteristics.

An embodiment of the invention provides an electronic apparatus including a display layer including non-folding areas arranged in a first direction and a folding area defined between the non-folding areas and foldable with respect to an imaginary folding axis extending in a second direction crossing the first direction, a digitizer disposed under the display layer, where the digitizer includes first sensing coils, second sensing coils insulated from the first sensing coils, and data lines connected to the second sensing coils, and a support layer disposed under the digitizer, where a plurality of openings is defined in a portion of the support layer overlapping the folding area. In such an embodiment, each of the first sensing coils includes a long side extending in the first direction and a short side extending in the second direction, each of the second sensing coils includes a long side extending in the second direction and a short side extending in the first direction, and a first width in the second direction of a portion of the data lines overlapping the folding area is greater than a second width in the second direction of a portion of the data lines not overlapping the folding area.

In an embodiment, the first width may be two times greater than the second width.

In an embodiment, the second width may be equal to or greater than about 10 micrometers (μm) and equal to or smaller than about 300 μm.

In an embodiment, a radius of curvature defined between the folding axis and a rear surface of the digitizer may be equal to or greater than about 1.5 millimeters (mm) and equal to or equal to or smaller than about 5 mm when the electronic apparatus is folded with respect to the folding axis.

In an embodiment, the first width increases as the radius of curvature decreases.

In an embodiment, the short side of each of the first sensing coils and the second sensing coils may be spaced apart from the folding area, and the long side of each of the first sensing coils may overlap the folding area.

In an embodiment, a separation distance between long sides nearest to the folding area among long sides of the second sensing coils may be equal to or smaller than about 10 μm.

In an embodiment, a width in the second direction of the portion of the support layer in which the openings are defined may be greater than the separation distance.

In an embodiment, the width in the second direction of the portion of the support layer in which the openings are defined may be two times greater than a radius of curvature defined between the folding axis and a rear surface of the digitizer when the electronic apparatus is folded with respect to the folding axis.

In an embodiment, the long side of the first sensing coils overlapping the folding area may have a width equal to or smaller than about 500 μm in the second direction.

In an embodiment, the long side of the first sensing coils overlapping the folding area may have a wave shape.

In an embodiment, the long side of the first sensing coils overlapping the folding area includes a plurality of diagonal patterns extending in a diagonal direction with respect to the first direction and the second direction.

In an embodiment, the digitizer may include a base layer including a front surface on which the first sensing coils and the data lines are disposed and a rear surface on which the second sensing coils are disposed, a first cover layer disposed on the front surface, and a second cover layer disposed on the rear surface, the data lines may be connected to the second sensing coils via a hole defined through the base layer, the front surface may be disposed adjacent to the display layer, and the rear surface may be opposite to the front surface.

In an embodiment, the electronic apparatus may further include a shielding layer disposed between the digitizer and the support layer.

In an embodiment, the electronic apparatus may further include a window disposed on the display layer and an optical film disposed between the window and the display layer.

An embodiment of the invention provides an electronic apparatus including a display layer including non-folding areas arranged in a first direction and a folding area defined between the non-folding areas and foldable at a predetermined radius of curvature with respect to an imaginary folding axis extending in a second direction crossing the first direction, a digitizer disposed under the display layer, where the digitizer includes first sensing coils, second sensing coils insulated from the first sensing coils, and data lines connected to the second sensing coils, and a support layer disposed under the digitizer, where a plurality of openings is defined in a portion of the support layer overlapping the folding area. In such an embodiment, the second sensing coils are spaced apart from the folding area, and a first width in the second direction of portion of the data lines overlapping the folding area is smaller than a second width in the second direction of a portion of the first sensing coils overlapping the folding area.

In an embodiment, the first width may be two times greater than a third width in the second direction of the data lines overlapping the non-folding areas, and the third width may be equal to or greater than about 10 μm and equal to or smaller than about 300 μm.

In an embodiment, the second width may be equal to or smaller than about 500 μm.

In an embodiment, a separation distance between long sides nearest to the folding area among long sides of the second sensing coils may be equal to or smaller than about 10 μm.

In an embodiment, a width in the second direction of the portion of the support layer in which the openings are defined may be greater than the separation distance.

According to embodiments of the invention, the width of a portion of the data lines overlapping the folding area is greater than the width of a portion of the data lines overlapping the non-folding areas, and thus, the cracks, which are generated in the data lines overlapping the folding area when the sensing coils form a loop with the data lines, are reduced. Accordingly, in such embodiments, the folding characteristics and the reliability of the sensor included in the electronic apparatus are improved.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1A:
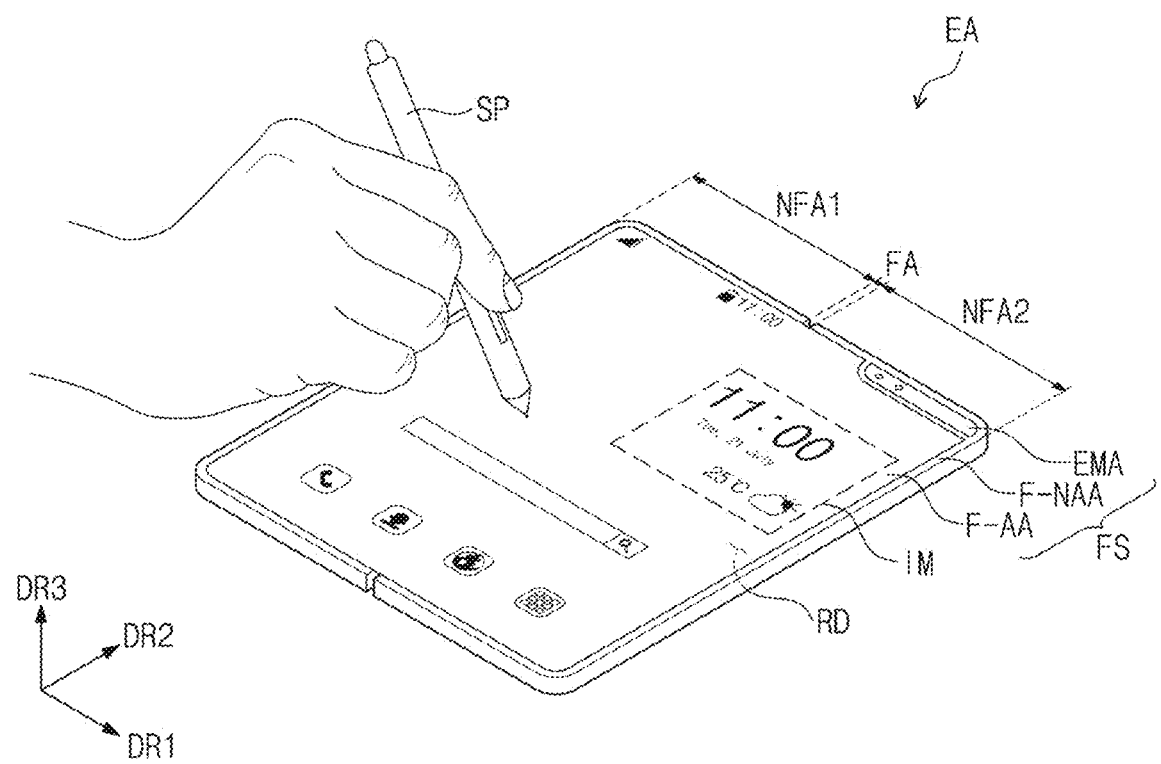
FIG. 1A is a perspective view of an electronic apparatus in an unfolded state according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the disclosure, it will be understood that when an element (or area, layer, or portion) is referred to as being "on", "connected to" or "coupled to" another element or layer, it can be directly on, connected or coupled to the other element or layer or intervening elements or layers may be present. In contrast, when an element is referred to as being "directly on" another element, there are no intervening elements present.

Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, etc., may be used herein to describe various elements, these elements should not be limited by these terms. These terms are only used to distinguish one element from another element. Thus, a first element discussed below could be termed a second element without departing from the teachings of the disclosure. As used herein, "a" "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "comprises" and/or "comprising," or "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

Figure 1B:
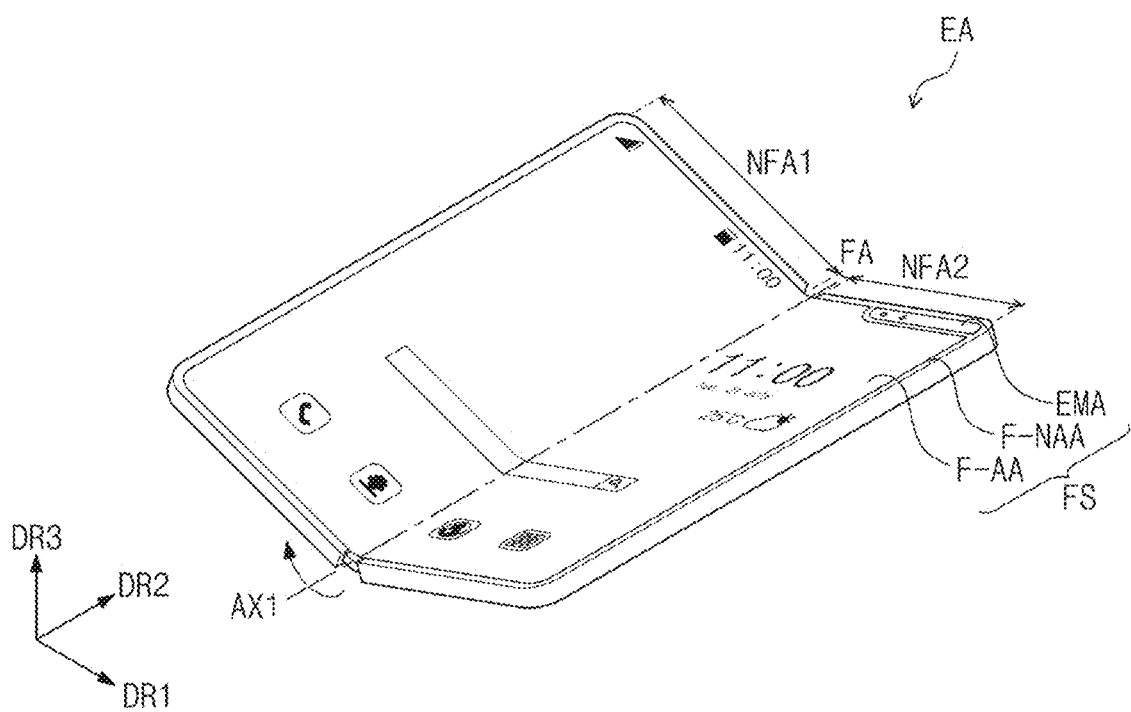
FIG. 1B is a perspective view of an electronic apparatus according to an embodiment of the disclosure.
Figure 1C:
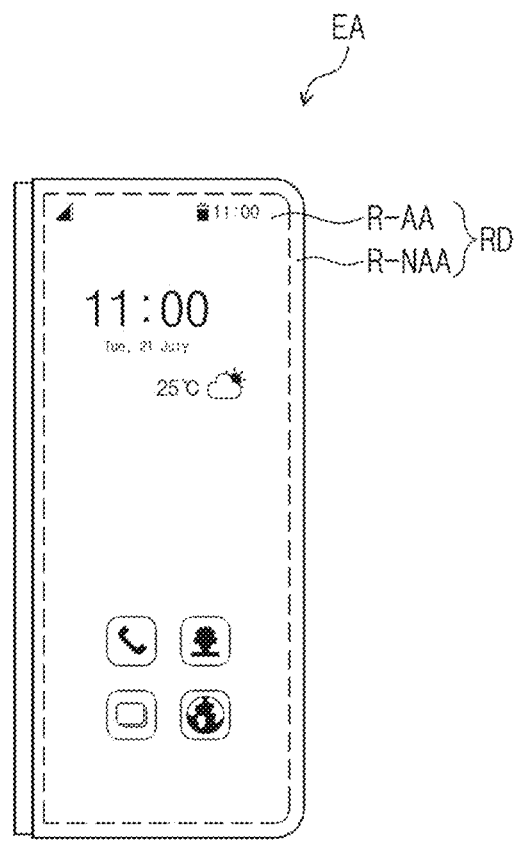
FIG. 1C is a plan view of an electronic apparatus in a folded state according to an embodiment of the disclosure.
Figure 1D:
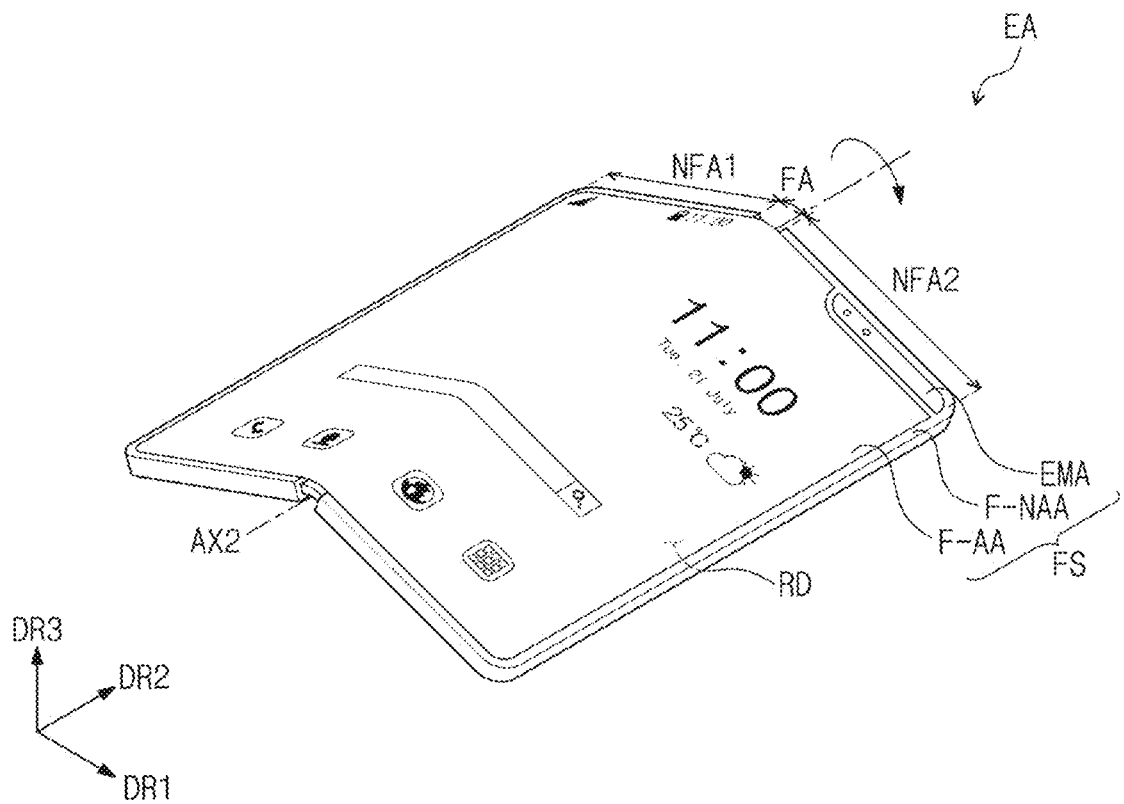
FIG. 1D is a perspective view of an electronic apparatus according to an embodiment of the disclosure.
Figure 2:
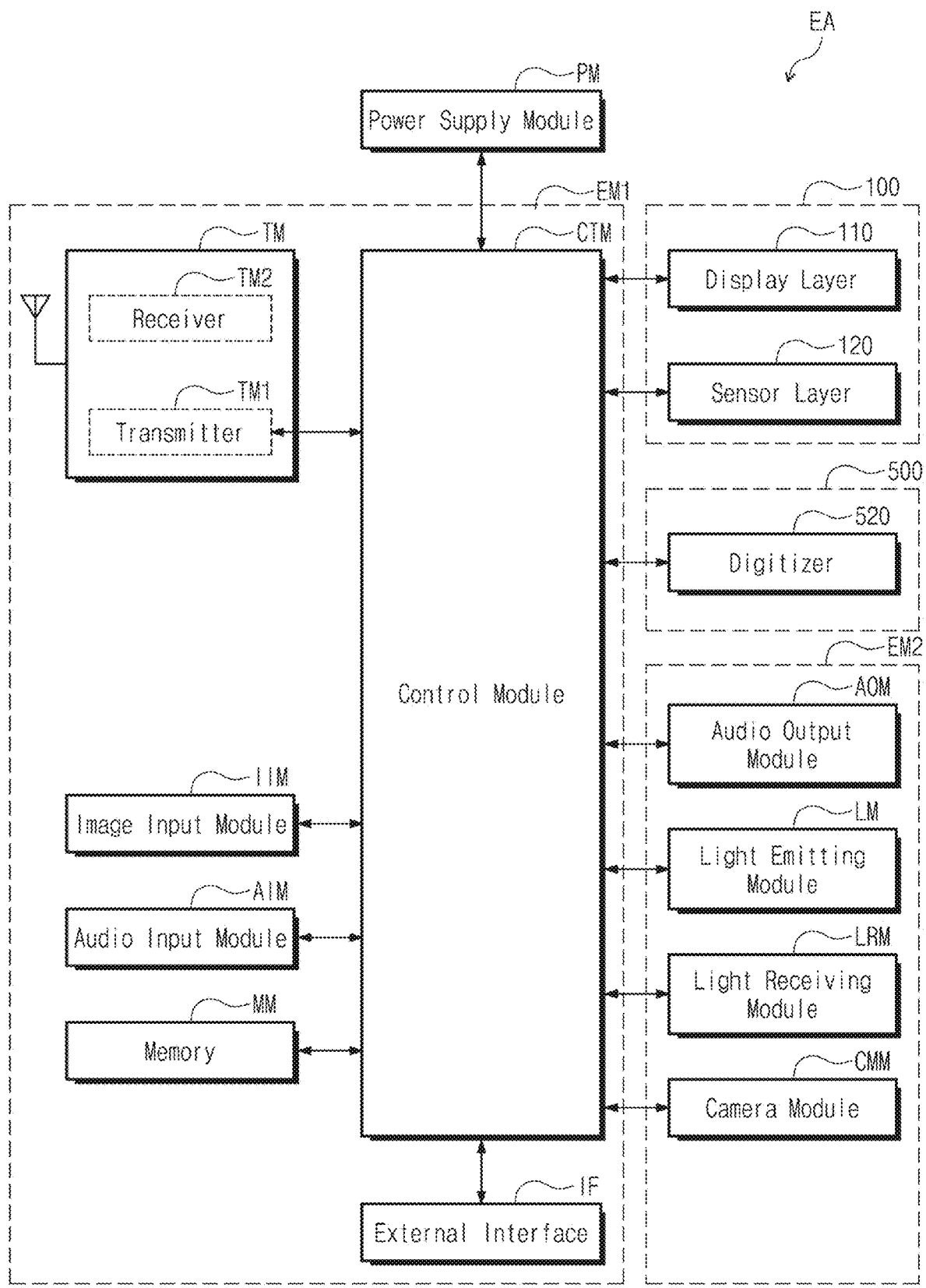
FIG. 2 is a block diagram of an electronic apparatus according to an embodiment of the disclosure.

FIG. 1A is a perspective view of an electronic apparatus EA in an unfolded state according to an embodiment of the disclosure. FIG. 1B is a perspective view of the electronic apparatus EA according to an embodiment of the disclosure. FIG. 1C is a plan view of the electronic apparatus EA in a folded state according to an embodiment of the disclosure. FIG. 1D is a perspective view of the electronic apparatus EA according to an embodiment of the disclosure. FIG. 2 is a block diagram of the electronic apparatus EA according to an embodiment of the disclosure.

Referring to FIG. 1A, in an embodiment, the electronic apparatus EA may be an apparatus activated in response to electrical signals. The electronic apparatus EA may include various embodiments. In an embodiment, for example, the electronic apparatus EA may include a tablet computer, a notebook computer, a computer, or a smart television. In an embodiment, as shown in FIG. 1A, the electronic apparatus EA may be a smartphone.

The electronic apparatus EA may display an image IM through a first display surface FS that is substantially parallel to each of a first direction DR1 and a second direction DR2 toward a third direction DR3. Here, the third direction DR3 may be a thickness direction of the electronic apparatus EA in the unfolded state. The first display surface FS through which the image IM is displayed may correspond to a front surface of the electronic apparatus EA. The image IM may include a video and a still image. FIG. 1A shows an embodiment where the image IM includes an internet search box and a clock widget.

In an embodiment, front (or upper) and rear (or lower) surfaces of each member of the electronic apparatus EA may be defined with respect to a direction in which the image IM is displayed. The front and rear surfaces may be opposite to each other in the third direction DR3, and a normal line direction of each of the front and rear surfaces may be substantially parallel to the third direction DR3.

A distance between the front surface and the rear surface in the third direction DR3 may correspond to a thickness or a height of the electronic apparatus EA in the third direction DR3. Here, directions indicated by the first, second, and third directions DR1, DR2, and DR3 may be relative to each other and may be changed to other directions.

The electronic apparatus EA may sense an external input applied thereto from an outside. The external input may include various types or forms of input provided from the outside of the electronic apparatus EA.

In an embodiment, for example, the external inputs may include a proximity input (e.g., a hovering input) applied by an object approaching close to or adjacent to the electronic apparatus EA at a predetermined distance as well as a touch input by a user's body part (e.g., a user's hand). In an embodiment, the external inputs may be provided in the form of force, pressure, temperature, light, etc.

FIG. 1A shows an embodiment of the external inputs applied using a pen SP by a user. Although not shown in figures, the pen SP may be attached to or detached from the electronic apparatus EA, and the electronic apparatus EA may provide or receive signals corresponding to the attachment and detachment of the pen SP.

In an embodiment, the electronic apparatus EA may include the first display surface FS and a second display surface RD. The first display surface FS may include a first active area F-AA, a first peripheral area F-NAA, and an electronic module area EMA. The second display surface RD may be opposite to at least a portion of the first display surface FS.

The first active area F-AA may be activated in response to the electrical signals. The image IM may be displayed through the first active area F-AA, and various external inputs may be sensed through the first active area F-AA.

The first peripheral area F-NAA may be defined adjacent to the first active area F-AA. The first peripheral area F-NAA may have a predetermined color. The first peripheral area F-NAA may surround the first active area F-AA. Accordingly, a shape of the first active area F-AA may be substantially defined by the first peripheral area F-NAA, however, this is merely one embodiment. Alternatively, the first peripheral area F-NAA may be defined adjacent to only one side of the first active area F-AA or may be omitted.

Various electronic modules may be disposed in the electronic module area EMA. In an embodiment, for example, the electronic module may include at least one selected from a camera, a speaker, an optical sensor, and a thermal sensor. The electronic module area EMA may sense an external subject through the display surfaces FS and RD or may provide a sound signal, such as a voice, to the outside through the display surfaces FS and RS. In an embodiment, the electronic module may include a plurality of components, but not being limited to a particular embodiment.

In an embodiment, the electronic module area EMA may be surrounded by the first active area F-AA and the first peripheral area F-NAA, but not being limited thereto or thereby. In an embodiment, the electronic module area EMA may be defined in the first active area F-AA, and the electronic module area EMA may not be particularly limited.

In an embodiment, the electronic apparatus EA may include at least one folding area FA and a plurality of non-folding areas NFA1 and NFA2 extending from the folding area FA. The non-folding areas NFA1 and NFA2 may be spaced apart from each other with the folding area FA interposed therebetween.

Referring to FIG. 1B, an embodiment of the electronic apparatus EA may include a first folding axis AX1 that is imaginary and extends in the second direction DR2. The first folding axis AX1 may extend in the second direction DR2 on the first display surface FS.

In such an embodiment, the non-folding areas NFA1 and NFA2 may extend from the folding area FA with the folding area FA interposed therebetween.

In an embodiment, for example, a first non-folding area NFA1 may extend from one side of the folding area FA in the first direction DR1, and a second non-folding area NFA2 may extend from another side (or an opposing side) of the folding area FA in the first direction DR1.

The electronic apparatus EA may be folded about the first folding axis AX1 to be in an in-folding state where one area of the first display surface FS, which overlaps the first non-folding area NFA1, faces the other area of the first display surface FS, which overlaps the second non-folding area NFA2.

Referring to FIG. 1C, the second display surface RD may be viewed by a user during the in-folding state of the electronic apparatus EA. In an embodiment, the second display surface RD may include a second active area R-AA through which the image is displayed. The second active area R-AA may be activated in response to electrical signals. The second active area R-AA may be an area through which the image is displayed and various external inputs are sensed.

A second peripheral area R-NAA may be defined adjacent to the second active area R-AA. The second peripheral area R-NAA may have a predetermined color. The second peripheral area R-NAA may surround the second active area R-AA. In an embodiment, although not shown in figures, the second display surface RD may further include an electronic module area in which an electronic module including various components is disposed, and the second display surface RD may not be particularly limited.

Referring to FIG. 1D, an embodiment of the electronic apparatus EA may include a second folding axis AX2 that is imaginary and extends in the second direction DR2. The second folding axis AX2 may extend in the second direction DR2 on the second display surface RD.

The electronic apparatus EA may be folded about the second folding axis AX2 to be in an out-folding state where one area of the second display surface RD, which overlaps the first non-folding area NFA1, faces the other area of the second display surface RD, which overlaps the second non-folding area NFA2.

However, embodiments of the electronic apparatus EA may not be limited thereto or thereby. In an embodiment, the electronic apparatus EA may be folded about a plurality of folding axes such that a portion of the first display surface FS and a portion of the second display surface RD face each other, and the number of the folding axes and the number of non-folding areas may not be particularly limited.

Referring to FIG. 2, an embodiment of the electronic apparatus EA may include a display module 100, a sensor 500, a power supply module PM, a first electronic module EM1, and a second electronic module EM2. The display module 100, the sensor 500, the power supply module PM, the first electronic module EM1, and the second electronic module EM2 may be electrically connected to each other.

The display module 100 may include a display layer 110 and a sensor layer 120. The display layer 110 may include configurations to generate the image IM. The user may view the image IM generated by the display layer 110 through the first display surface FS.

The first electronic module EM1 and the second electronic module EM2 may include various functional modules to operate the electronic apparatus EA. The first electronic module EM1 may be mounted directly on a mother board that is electrically connected to the display module 100 or may be electrically connected to the mother board via a connector (not shown) after being mounted on a separate substrate.

The first electronic module EM1 may include a control module CTM, a wireless communication module TM, an image input module IIM, an audio input module AIM, a memory MM, and an external interface IF. Some modules among the modules of the first electronic module EM1 may be electrically connected to the mother board through a flexible circuit board without being mounted on the mother board.

The control module CTM may control an overall operation of the electronic apparatus EA. The control module CTM may be, but not limited to, a microprocessor. In an embodiment, for example, the control module CTM may activate or deactivate the display module 100. The control module CTM may control other modules, such as the image input module IIM, the audio input module AIM, or the like, based on a touch signal provided from the display module 100.

The wireless communication module TM may transmit/receive a wireless signal to/from other terminals using a Bluetooth® or WiFi© link. The wireless communication module TM may transmit/receive a voice signal using a general communication line. The wireless communication module TM may include a transmitter TM1 that modulates a signal to be transmitted and transmits the modulated signal and a receiver TM2 that demodulates the signal applied thereto.

The image input module IIM may process an image signal and may convert the image signal into image data that may be displayed through the display module 100. The audio input module AIM may receive an external sound signal through a microphone in a record mode or a voice recognition mode and may convert the external sound signal to electrical voice data.

The external interface IF may serve as an interface between the control module CTM and external devices, such as an external charger, a wired/wireless data port, a card socket e.g., a memory card and a SIM/UIM card, etc.

The second electronic module EM2 may include an audio output module AOM, a light emitting module LM, a light receiving module LRM, and a camera module CMM. The modules of the second electronic module EM2 may be electrically connected to the display module 100 or the first electronic module EM1 after being mounted directly on a mother board or through a connector (not shown) after being mounted on a separate substrate.

The audio output module AOM may convert the sound data provided from the wireless communication module TM or the sound data stored in the memory MM and may output the converted sound data to the outside.

The light emitting module LM may generate a light and may output the light. The light emitting module LM may emit an infrared ray. The light emitting module LM may include an LED element. The light receiving module LRM may sense the infrared ray. The light receiving module LRM may be activated when the infrared ray having a predetermined level or higher is sensed. The light receiving module LRM may include a complementary metal oxide semiconductor ("CMOS") sensor. The infrared ray generated by and output from the light emitting module LM may be reflected by an external object, e.g., a user's finger or face, and the reflected infrared ray may be incident into the light receiving module LRM. The camera module CMM may take an image of an external object.

The sensor 500 may include a digitizer 520. The digitizer 520 may include a plurality of sensing coils and may sense the external inputs by an electromagnetic resonance ("EMR") method. According to the EMR method, a resonant circuit provided in the pen SP generates a magnetic field, the vibrating magnetic field induces signals to the coils included in the digitizer 520, and a position of the pen SP (refer to FIG. 1A) is detected based on the signals induced to the coils. The digitizer 520 will be described in greater detail later.

In an embodiment, although not shown in figures, the electronic apparatus EA may further include a transparent member disposed between the electronic modules and the display module 100. The transparent member may be an optically transparent film such that the external input transmitting through the first display surface FS is transmitted to the electronic module via the transparent member.

The transparent member may be attached to a rear surface of the display module 100 or may be disposed between the display module 100 and the electronic module without a separate adhesive layer. According to an embodiment, the structure of the electronic apparatus EA may be variously modified, but not being particularly limited.

Figure 3:
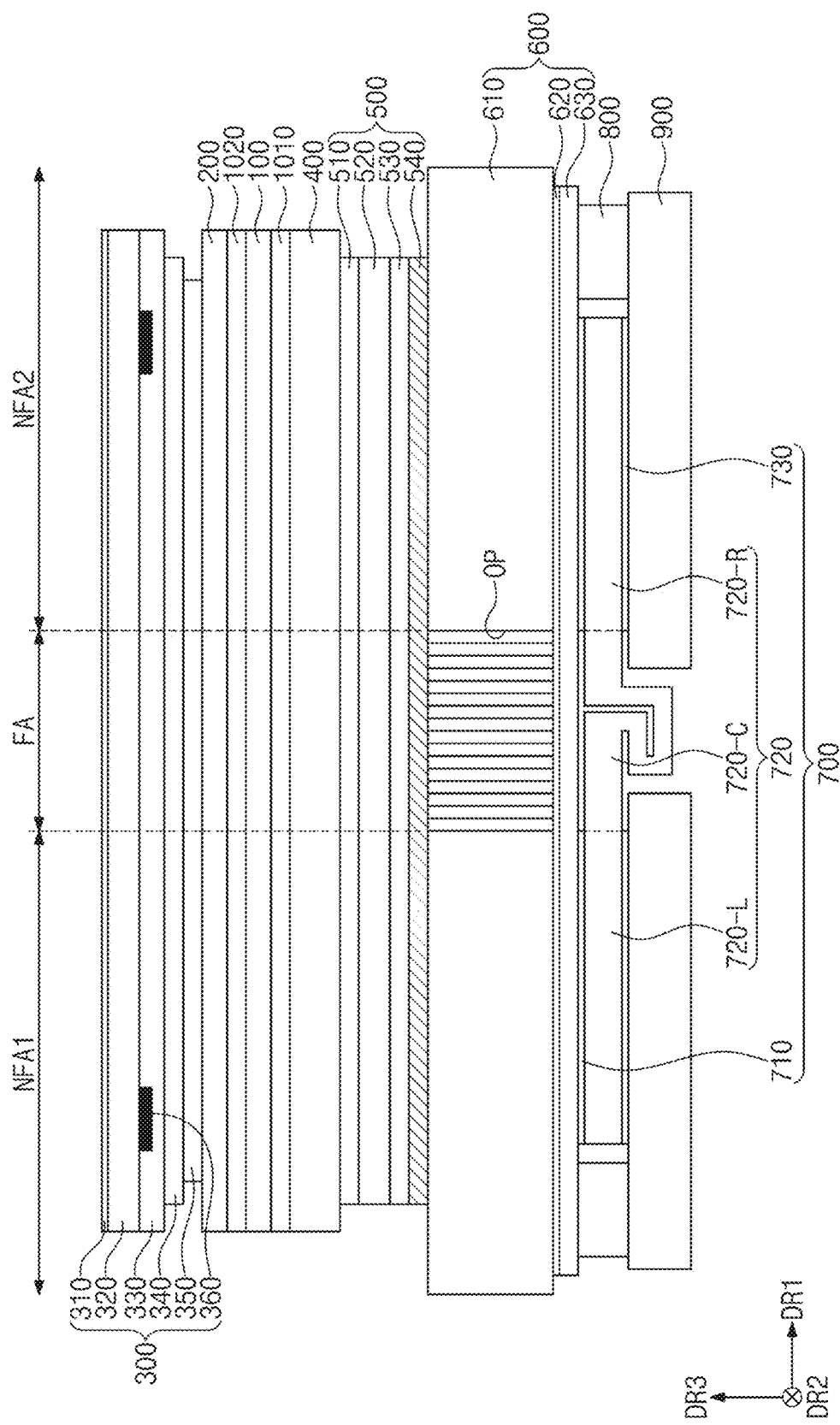
FIG. 3 is a cross-sectional view of an electronic apparatus according to an embodiment of the disclosure.
Figure 4A:
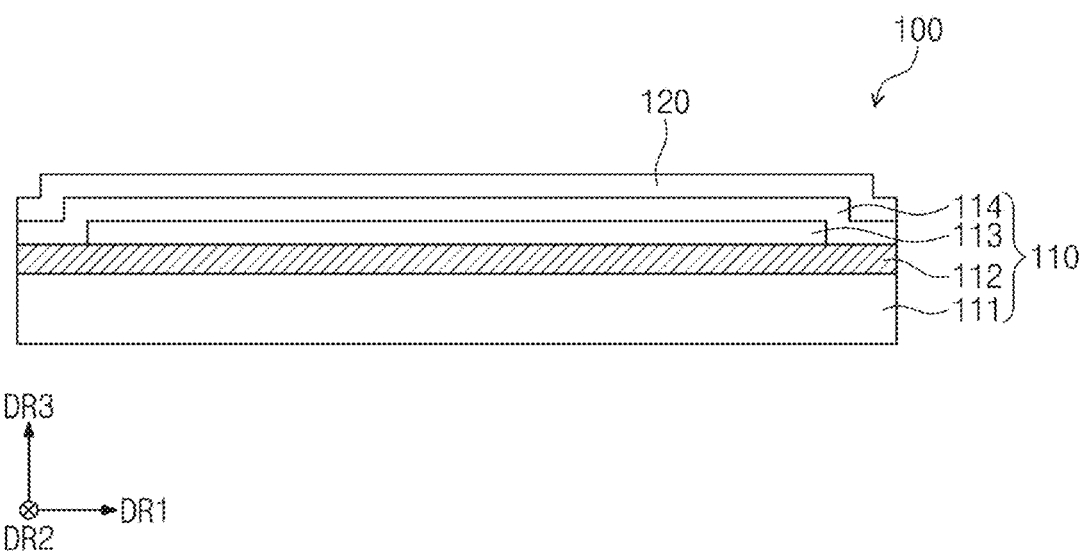
FIG. 4A is a cross-sectional view of a display layer according to an embodiment of the disclosure.
Figure 4B:
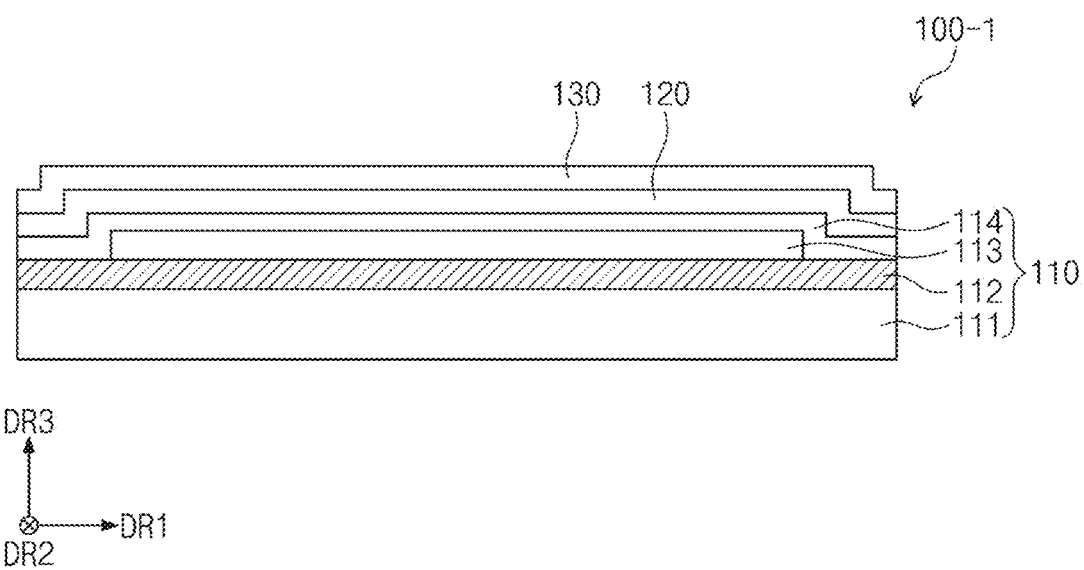
FIG. 4B is a cross-sectional view of a display layer according to an embodiment of the disclosure.

FIG. 3 is a cross-sectional view of an electronic apparatus according to an embodiment of the disclosure. FIG. 4A is a cross-sectional view of a display layer according to an embodiment of the disclosure. FIG. 4B is a cross-sectional view of a display layer according to an embodiment of the disclosure.

Referring to FIG. 3, an embodiment of the electronic apparatus EA may include a window module 300, an optical film 200, a display module 100, a panel protective layer 400, a sensor 500, a lower plate 600, a heat dissipation sheet 700, a gap tape 800, and a metal plate 900. In such an embodiment, the electronic apparatus EA may include insulating layers 1010 and 1020 that attach the above-mentioned elements to each other.

Adhesive layers described hereinafter may be a transparent adhesive layer including one selected from a pressure sensitive adhesive ("PSA") film, an optically clear adhesive ("OCA") film, and an optically clear resin ("OCR"). In an embodiment, at least one adhesive layer among the adhesive layers may be omitted.

The window module 300 may include a glass substrate 340, a window protective layer 320 disposed above the glass substrate 340, and a light blocking pattern 360 disposed on a lower surface of the window protective layer 320. In an embodiment, the window protective layer 320 may include a plastic film. Accordingly, the window module 300 may further include a first adhesive layer 330 that attaches the window protective layer 320 to the glass substrate 340.

The glass substrate 340 may have a thickness in a range from about 15 micrometers (μm) to about 45 μm. In an embodiment, the glass substrate 340 may be a chemically strengthened glass. In such an embodiment, the occurrence of crease in glass substrate 340 may be minimized even though the folding and unfolding operations are repeatedly performed.

The window protective layer 320 may have a thickness in a range from about 50 μm to about 80 μm. The window protective layer 320 may include at least one selected from polyimide, polycarbonate, polyamide, triacetylcellulose, polymethylmethacrylate, and polyethylene terephthalate.

According to an embodiment, the window module 300 may include a hard coating layer 310. The hard coating layer 310 may be disposed on the window protective layer 320 and may be disposed as an outermost layer of the window module 300. The hard coating layer 310 may be coated on the window protective layer 320 as a functional layer that improves characteristics of use of the electronic apparatus EA. In an embodiment, for example, the hard coating layer 310 may improve anti-fingerprint characteristics, anti-pollution characteristics, anti-reflective characteristics, scratch-resistant characteristics, and the like.

The light blocking pattern 360 may overlap the first peripheral area F-NAA shown in FIG. 1A. In an embodiment, the light blocking pattern 360 may be disposed on one surface of the window protective layer 320, which faces the glass substrate 340.

In an embodiment, as shown in FIG. 3, the light blocking pattern 360 may be disposed inside the window protective layer 320 at a predetermined distance from an end of the window protective layer 320, but not being limited thereto or thereby. According to an alternative embodiment, the light blocking pattern 360 may be disposed under the window protective layer 320 to be aligned with the end of the window protective layer 320, but not being limited thereto or thereby.

The light blocking pattern 360 may be a colored light blocking layer and may be formed by a coating method. The light blocking pattern 360 may include a base material and a pigment or a dye mixed with the base material. Accordingly, the user may recognize the first peripheral area F-NAA of the electronic apparatus EA due to the predetermined color of the light blocking pattern 360.

FIG. 3 shows an embodiment where the light blocking pattern 360 is disposed on the lower surface of the window protective layer 320, but not being limited thereto or thereby. According to an alternative embodiment, the light blocking pattern 360 may be disposed on one of an upper surface of the window protective layer 320, an upper surface of the glass substrate 340, or a lower surface of the glass substrate 340.

A second adhesive layer 350 may attach the window module 300 and the optical film 200 to each other.

The optical film 200 may be disposed between the window module 300 and the display module 100. The optical film 200 may reduce a reflectance with respect to an external light. The optical film 200 may include a retarder and/or a polarizer. The optical film 200 may include at least a polarization film.

The display module 100 may be disposed between the optical film 200 and the panel protective layer 400. The display module 100 may include configurations or elements to generate the image IM and to sense an input applied thereto from the outside. In an embodiment, for example, the display module 100 may include the display layer 110 and the sensor layer 120 described with reference to FIG. 2.

A third adhesive layer 1020 may attach the optical film 200 to the display module 100 to each other.

The display module 100 may include the display layer 110 and the sensor layer 120. The display layer 110 may include configurations to generate the image. The display layer 110 may be one of an organic light emitting display layer, a quantum-dot display layer, and an inorganic light emitting display layer, but not being particularly limited.

Referring to FIG. 4A, in an embodiment, the display layer 110 may include a base layer 111, a circuit element layer 112, a display element layer 113, and an encapsulation layer 114.

The base layer 111 may include a synthetic resin film. The synthetic resin film may include a thermosetting resin. The base layer 111 may have a multi-layer structure. In an embodiment, for example, the base layer 111 may have a three-layer structure of a synthetic resin layer, an adhesive layer, and a synthetic resin layer. The synthetic resin layer may include a polyimide-based resin, however, a material for the synthetic resin layer may not be particularly limited. The synthetic resin layer may include at least one selected from an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. In an embodiment, the base layer 111 may be a glass substrate or an organic/inorganic composite material layer.

The circuit element layer 112 may be disposed on the base layer 111. The circuit element layer 112 may include an insulating layer, a semiconductor pattern, a conductive pattern, and a signal line. An insulating layer, a semiconductor layer, and a conductive layer may be formed on the base layer 111 by a coating or depositing process. Then, the insulating layer, the semiconductor layer, and the conductive layer may be selectively patterned through several photolithography processes. The semiconductor pattern, the conductive pattern, and the signal line included in the circuit element layer 112 may be formed through such processes.

The display element layer 113 may be disposed on the circuit element layer 112. The display element layer 113 may include a light emitting element. In an embodiment, for example, the display element layer 113 may include an organic light emitting material, a quantum dot, a quantum rod, or a micro-light emitting diode ("LED").

The encapsulation layer 114 may be disposed on the display element layer 113. The encapsulation layer 114 may include an inorganic layer, an organic layer, and an inorganic layer, which are sequentially stacked, but the layers of the encapsulation layer 114 may not be limited thereto or thereby.

The inorganic layers may protect the display element layer 113 from moisture and oxygen, and the organic layer may protect the display element layer 113 from a foreign substance such as dust particles. The inorganic layers may include a silicon nitride layer, a silicon oxynitride layer, a silicon oxide layer, a titanium oxide layer, or an aluminum oxide layer. The organic layer may include an acrylic-based organic layer, but not being limited thereto or thereby.

Referring to FIG. 4B, in an embodiment, a display module 100-1 may further include an optical film 130 disposed on the sensor layer 120. In such an embodiment where the electronic apparatus EA includes the display module 100-1, the optical film 200 and the third adhesive layer 1020, which are described with reference to FIG. 3, may be omitted.

The sensor layer 120 may be disposed on the display layer 110. The sensor layer 120 may sense an external input applied thereto from the outside. In an embodiment, for example, the external input may be a user input. The user input may include a variety of external inputs, such as a part of user's body, light, heat, pen, or pressure.

In an embodiment, the sensor layer 120 may be formed on the display layer 110 through successive processes. In such an embodiment, the sensor layer 120 may be disposed directly on the display layer 110. In the disclosure, the expression "the sensor layer 120 is disposed directly on the display layer 110" means that no intervening elements are between the sensor layer 120 and the display layer 110. That is, a separate adhesive member may not be disposed between the sensor layer 120 and the display layer 110.

However, embodiments of the disclosure may not be limited thereto or thereby. According to an alternative embodiment, the sensor layer 120 may be provided as a separate module and may be combined with the display layer 110 by an adhesive member. The adhesive member may include a conventional adhesive.

The panel protective layer 400 may be disposed under the display module 100. The panel protective layer 400 may be disposed under the display module 100 and may protect the display module 100. The panel protective layer 400 may include a flexible plastic material. In an embodiment, for example, the panel protective layer 400 may include polyethylene terephthalate.

In an embodiment, as shown in FIG. 3, the panel protective layer 400 may overlap the folding area FA and the non-folding areas NFA1 and NFA2, but not being limited thereto or thereby. According to an embodiment, the panel protective layer 400 may include two protective layers that do not overlap the folding area FA and respectively overlap the non-folding areas NFA1 and NFA2.

A fourth adhesive layer 1010 may attach the display module 100 to the panel protective layer 400.

The sensor 500 may be disposed under the display module 100. The sensor 500 may include the digitizer 520 including a plurality of sensing coils, a sensing shielding layer 540, and a plurality of adhesive layers 510 and 530. A first sensing adhesive layer 510 may be disposed between the display module 100 and the digitizer 520, and a second sensing adhesive layer 530 may be disposed between the digitizer 520 and the sensing shielding layer 540.

The digitizer 520 of the sensor 500 may sense a signal transmitted by the pen SP (refer to FIG. 1A) among the external inputs. The digitizer 520 may sense the external inputs by an EMR method. According to the EMR method, a resonant circuit provided in the pen SP generates a magnetic field, the vibrating magnetic field induces signals to the coils included in the sensor 500, and a position of the pen SP is detected based on the signals induced to the coils. The digitizer 520 will be described in detail later.

The sensing shielding layer 540 may be disposed under the digitizer 520.

The sensing shielding layer 540 may include a metal material. In an embodiment, for example, the sensing shielding layer 540 may include a magnetic metal powder ("MMP"), however, a material for the sensing shielding layer 540 may not be limited thereto or thereby. According to an embodiment, the sensing shielding layer 540 may include a permalloy, which is an alloy of nickel (Ni) and iron (Fe), an invar, or a stainless steel.

In an embodiment, as shown in FIG. 3, the sensing shielding layer 540 may have a flat shape in the folding area FA, but not being limited thereto or thereby. According to an alternative embodiment, the sensing shielding layer 540 may overlap only the non-folding areas NFA1 and NFA2, may be spaced apart from the folding area FA, and may be provided with a plurality of openings defined therethrough to overlap the folding area FA, but not being particularly limited.

The lower plate 600 may be disposed under the sensor 500. The lower plate 600 may include a support layer 610, a fifth adhesive layer 620, and a protective layer 630.

The support layer 610 may be disposed under the sensor 500. The support layer 610 may support components disposed thereon and may maintain an unfolded state and a folded state of the display module 100. In such an embodiment, a heat dissipation performance of the electronic apparatus EA may be improved by the support layer 610.

A plurality of openings OP may be defined in an area overlapping the folding area FA of the support layer 610. Accordingly, a shape of the support layer 610 overlapping the folding area FA may be easily changed due to the openings OP.

The support layer 610 may be provided as (or defined by) a conductive plate. In an embodiment, the support layer 610 may include a metal material such as a stainless steel, for example. In an embodiment, for example, the support layer 610 may include SUS 304, but not being limited thereto or thereby. According to an embodiment, the support layer 610 may include a variety of metal materials. In an embodiment, the support layer 610 may be provided as a non-conductive plate. In such an embodiment, the support layer 610 may be provided as a plate containing a carbon fiber, but not being particularly limited.

The protective layer 630 may be disposed under the support layer 610. The protective layer 630 may cover the openings OP defined through the support layer 610. The protective layer 630 may have an elastic modulus smaller than that of the support layer 610. In an embodiment, for example, the protective layer 630 may include thermoplastic polyurethane, rubber, or silicone, but not being limited thereto or thereby. In an embodiment, the protective layer 630 may be attached to a lower portion of the support layer 610 after being manufactured in the form of a sheet.

The fifth adhesive layer 620 may attach the protective layer 630 to the support layer 610.

The heat dissipation sheet 700 may be disposed under the protective layer 630. The heat dissipation sheet 700 may be a heat conductive sheet with a high heat conductivity. The heat dissipation sheet 700 may include a heat dissipation layer 720 containing graphite. In an embodiment, where the electronic apparatus EA includes the heat dissipation sheet 700, the heat dissipation performance of the electronic apparatus EA may be improved.

In an embodiment, as shown in FIG. 3, the heat dissipation layer 720 may include flat portions 720-L and 720-R respectively overlapping the non-folding areas NFA1 and NFA2 and a rolling portion 720-C overlapping the folding area FA and disposed between the flat portions 720-L and 720-R.

The rolling portion 720-C may be rolled in a predetermined direction when the electronic apparatus EA is in the unfolded state (refer to FIG. 1A) and may be unfolded when the electronic apparatus EA is in the folded state (refer to FIG. 1C). In the unfolded state of the electronic apparatus EA, the rolling portion 720-C may be folded in an angled form or may be rolled in a curved form with a predetermined curvature, but not being particularly limited.

In an embodiment where the heat dissipation layer 720 includes the rolling portion 720-C overlapping the folding area FA, the shape of the heat dissipation sheet 700 may be easily changed when the electronic apparatus EA is folded. Therefore, the folding characteristics of the electronic apparatus EA may be improved.

However, embodiments of the disclosure may not be limited thereto or thereby. According to an alternative embodiment, the heat dissipation layer 720 may be provided in plural, and the heat dissipation layers 720 may be spaced apart from each other with at least a portion of the folding area FA interposed therebetween, or the heat dissipation layer 720 may be provided in a single unitary pattern to overlap the folding area FA and the non-folding areas NFA1 and NFA2, but not being particularly limited.

Sixth adhesive layers 710 and 730 may attach the protective layer 630 to the heat dissipation sheet 700 and may attach the heat dissipation sheet 700 to the metal plates 900. The sixth adhesive layers 710 and 730 may be disposed on an upper surface and a lower surface of each of the flat portions 720-L and 720-R of the heat dissipation sheet 700, respectively, and may attach the heat dissipation sheet 700 to the protective layer 630 and the metal plates 900. According to an embodiment, the sixth adhesive layers 710 and 730 may not overlap the folding area FA. Accordingly, the shape of the rolling portion 720-C overlapping the folding area FA may be easily changed without being interfered by the sixth adhesive layers 710 and 730 when folded or unfolded.

The metal plates 900 may be arranged in the first direction DR1 and may be spaced apart from each other with the rolling portion 720-C interposed therebetween. The metal plates 900 may be arranged in the first direction DR1 and may be spaced apart from each other with at least a portion of the folding area FA interposed therebetween. Accordingly, in the unfolded state of the electronic apparatus EA, the rolling portion 720-C may be easily disposed between the metal plates 900. In such an embodiment, the metal plates 900 may prevent the shape of the area of the support layer 610 in which the openings OP are defined from being deformed due to a pressure applied on the support layer 610.

Each of the metal plates 900 may include a metal material such as a stainless steel. In an embodiment, for example, the metal plates 900 may include SUS 304, but not being limited thereto or thereby. The metal plates 900 may include a variety of metal materials.

The gap tape 800 may be disposed between the protective layer 630 and the metal plates 900 and may compensate for a step difference caused by a thickness of the heat dissipation sheet 700. Accordingly, the gap tape 800 may be disposed along an edge of the heat dissipation sheet 700 to surround the heat dissipation sheet 700 and may be disposed spaced apart from the heat dissipation sheet 700. The gap tape 800 may include the same material as that of the adhesive layers and may include a plurality of layers.

In an embodiment, for example, the gap tape 800 may include a base layer, an upper adhesive layer disposed on an upper surface of the base layer and attached to the protective layer 630, and a lower adhesive layer disposed on a lower surface of the base layer and attached to a corresponding metal plate 900.

Figure 5A:
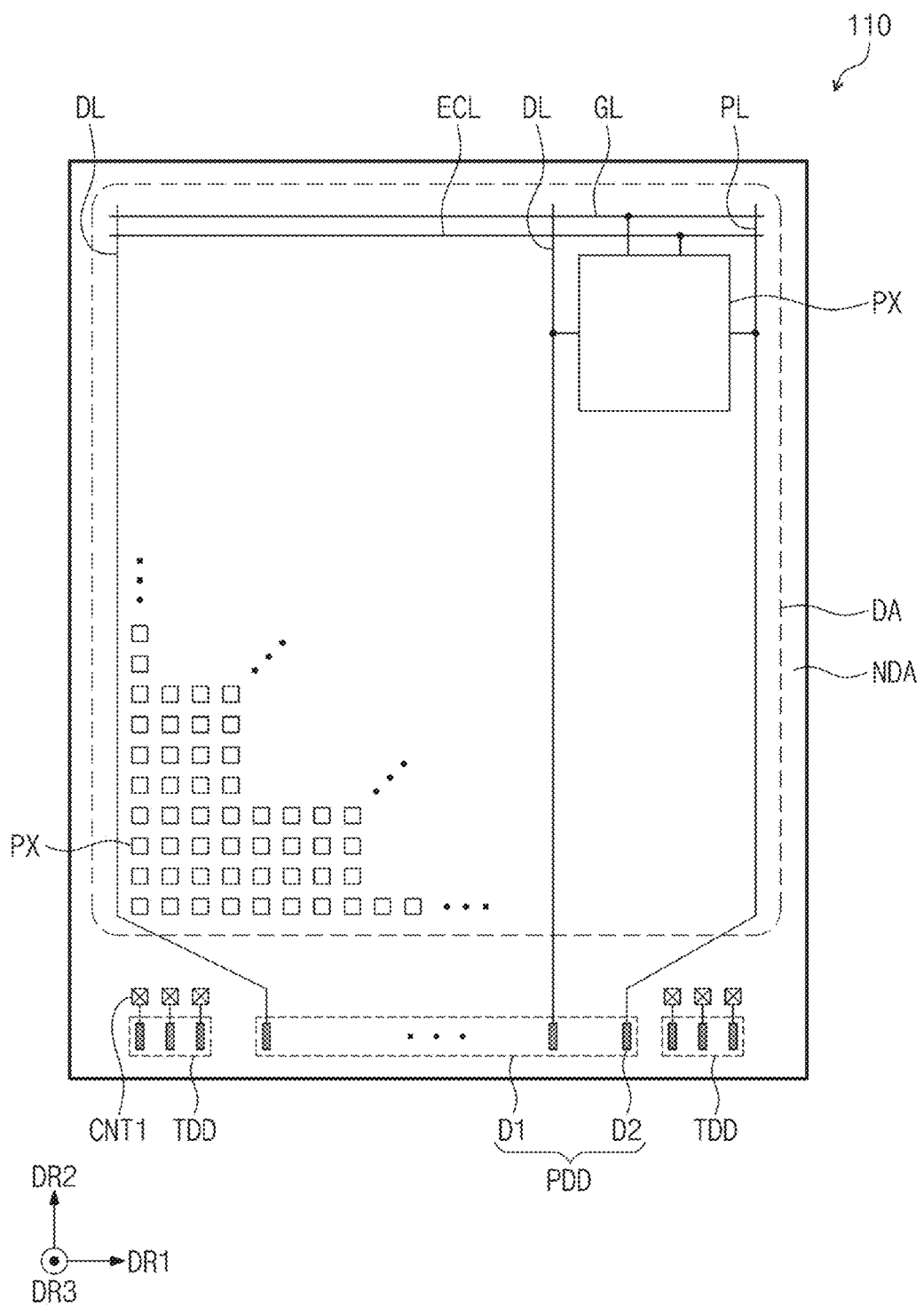
FIG. 5A is a plan view of a display layer according to an embodiment of the disclosure.
Figure 5B:
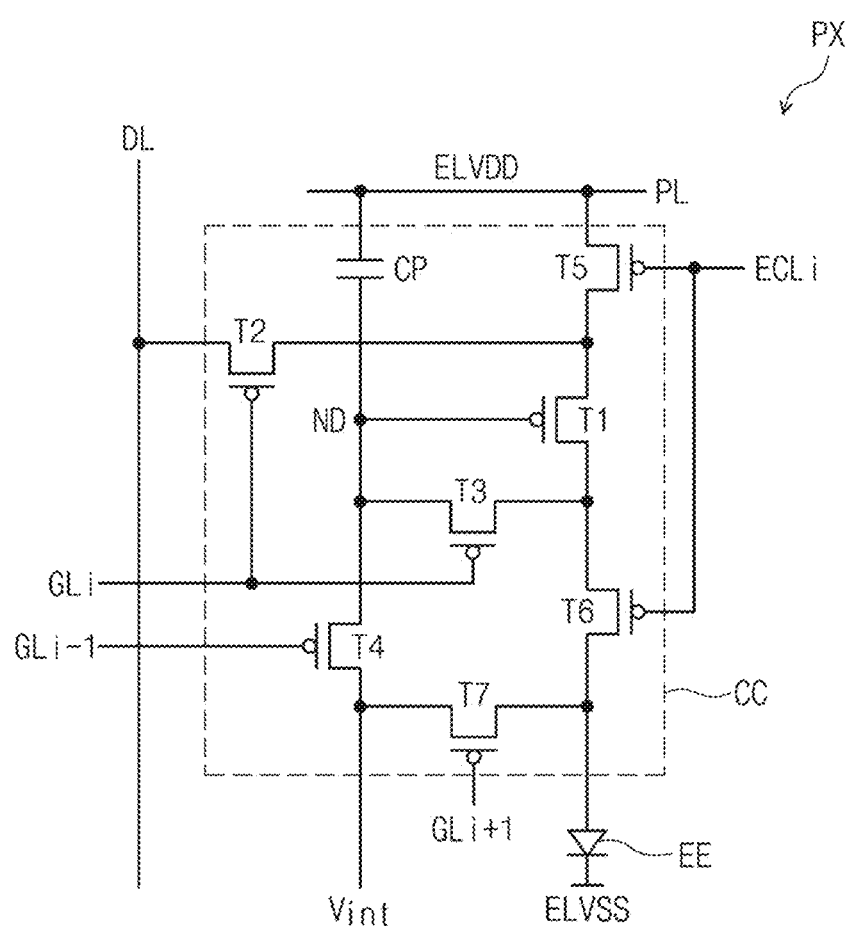
FIG. 5B is an equivalent circuit diagram of a pixel according to an embodiment of the disclosure.
Figure 6:
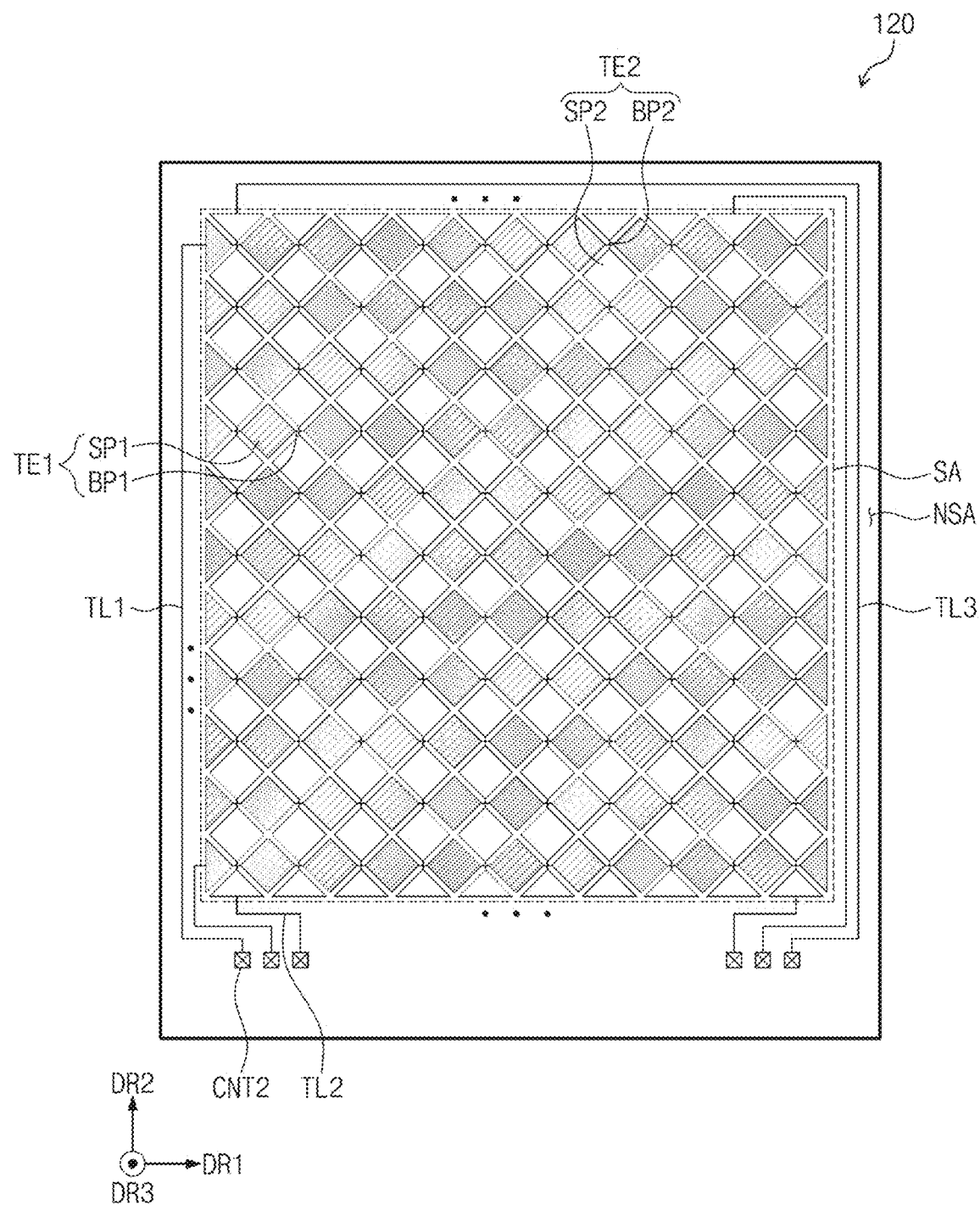
FIG. 6 is a plan view of a sensor layer according to an embodiment of the disclosure.

FIG. 5A is a plan view of the display layer 110 according to an embodiment of the disclosure. FIG. 5B is an equivalent circuit diagram of a pixel PX according to an embodiment of the disclosure. FIG. 6 is a plan view of the sensor layer 120 according to an embodiment of the disclosure. In FIGS. 5A, 5B, and 6, the same/similar reference numerals denote the same/similar elements in FIGS. 1A to 4B, and thus, any repetitive detailed descriptions of the same/similar elements will be omitted or simplified.

Referring to FIG. 5A, an embodiment of the display layer 110 may include a plurality of pixels PX, a plurality of signal lines GL, DL, PL, and ECL, and a plurality of display pads PDD. The display layer 110 may include a display area DA through which the image is displayed and a non-display area NDA in which a driving circuit or a driving line is disposed. The display area DA may overlap at least a portion of the active areas F-AA and R-AA (refer to FIGS. 1A and 1C) of the electronic apparatus EA. In such an embodiment, the non-display area NDA may overlap the peripheral areas F-NAA and R-NAA (refer to FIGS. 1A and 1C) of the electronic apparatus EA.

The signal lines GL, DL, PL, and ECL may be connected to the pixels PX to apply electrical signals to the pixels PX. In an embodiment, as shown in FIG. 5A, the signal lines in the display layer 110, may include a scan line GL, a data line DL, a power line PL, and an emission control line ECL, for example, but not being limited thereto. Alternatively, the signal lines GL, DL, PL, and ECL may further include an initialization voltage line, and the signal lines GL, DL, PL, and ECL may not be particularly limited.

The pixels PX may be arranged in the first direction DR1 and the second direction DR2 and may be spaced apart from each other to form a matrix configuration in a plan view.

FIG. 5B shows an embodiment of a signal circuit diagram of one pixel PX among the pixels PX. FIG. 5B shows an embodiment of the pixel PX connected to an i-th scan line GLi and an i-th emission control line ECLi.

The pixel PX may include a light emitting element EE and a pixel circuit CC. The pixel circuit CC may include a plurality of transistors T1 to T7 and a capacitor CP. The transistors T1 to T7 may be formed through a low temperature polycrystalline silicon ("LTPS") process or a low temperature polycrystalline oxide ("LTPO") process.

The pixel circuit CC may control an amount of current flowing through the light emitting element EE in response to a data signal. The light emitting element EE may emit a light at a predetermined luminance in response to the amount of the current provided from the pixel circuit CC. In such an embodiment, a first power voltage ELVDD may have a voltage level set higher than a voltage level of a second power voltage ELVSS. The light emitting element EE may include an organic light emitting element or a quantum dot light emitting element.

Each of the transistors T1 to T7 may include an input electrode (or a source electrode), an output electrode (or a drain electrode), and a control electrode (or a gate electrode). In the disclosure, for the convenience of description, one electrode of the input electrode and the output electrode may be referred to as a first electrode, and the other electrode of the input electrode and the output electrode may be referred to as a second electrode.

A first electrode of a first transistor T1 is connected to the first power voltage ELVDD via a fifth transistor T5, and a second electrode of the first transistor T1 is connected to an anode electrode of the light emitting element EE via a sixth transistor T6. The first transistor T1 may be referred to as a driving transistor in the disclosure.

The first transistor T1 controls the amount of the current flowing through the light emitting element EE in response to a voltage applied to a control electrode of the first transistor T1.

A second transistor T2 is connected between the data line DL and the first electrode of the first transistor T1. A control electrode of the second transistor T2 is connected to the i-th scan line GLi. When an i-th scan signal is applied to the i-th scan line GLi, the second transistor T2 is turned on to electrically connect the data line DL to the first electrode of the first transistor T1.

A third transistor T3 is connected between the second electrode of the first transistor T1 and the control electrode of the first transistor T1. A control electrode of the third transistor T3 is connected to the i-th scan line GLi. When the i-th scan signal is applied to the i-th scan line GLi, the third transistor T3 is turned on to electrically connect the second electrode of the first transistor T1 to the control electrode of the first transistor T1. Accordingly, when the third transistor T3 is turned on, the first transistor T1 is connected in a diode configuration.

A fourth transistor T4 is connected between a node ND and an initialization power generator (not shown). A control electrode of the fourth transistor T4 is connected to an (i−1)-th scan line GLi−1. When an (i−1)-th scan signal is applied to the (i−1)-th scan line GLi−1, the fourth transistor T4 is turned on to apply an initialization voltage Vint to the node ND.

The fifth transistor T5 is connected between the power line PL and the first electrode of the first transistor T1. A control electrode of the fifth transistor T5 is connected to the i-th emission control line ECLi.

The sixth transistor T6 is connected between the second electrode of the first transistor T1 and the anode electrode of the light emitting element EE. A control electrode of the sixth transistor T6 is connected to the i-th emission control line ECLi.

A seventh transistor T7 is connected between the initialization power generator (not shown) and the anode electrode of the light emitting element EE. A control electrode of the seventh transistor T7 is connected to an (i+1)-th scan line GLi+1. When an (i+1)-th scan signal is applied to the (i+1)-th scan line GLi+1, the seventh transistor T7 is turned on to apply the initialization voltage Vint to the anode electrode of the light emitting element EE.

The seventh transistor T7 may improve a black expression capability of the pixel PX. In such an embodiment, when the seventh transistor T7 is turned on, a parasitic capacitor (not shown) of the light emitting element EE is discharged. Then, even though a leakage current is generated from the first transistor T1, the light emitting element EE may not emit the light when black luminance is displayed, and thus, the black expression capability may be improved.

In an embodiment, as shown in FIG. 5B, the control electrode of the seventh transistor T7 may be connected to the (i+1)-th scan line GLi+1, but not being limited thereto or thereby. According to an alternative embodiment, the control electrode of the seventh transistor T7 may be connected to the i-th scan line GLi or the (i−1)-th scan line GLi−1.

The capacitor CP is connected between the power line PL and the node ND. The capacitor CP is charged with a voltage corresponding to the data signal. When the fifth transistor T5 and the sixth transistor T6 are turned on, the amount of the current flowing through the first transistor T1 may be determined by the voltage charged in the capacitor CP.

In the disclosure, an equivalent circuit of the pixel PX may not be limited to the equivalent circuit shown in FIG. 5B. According to an embodiment, the pixel PX may be implemented in various ways to allow the light emitting element EE to emit the light. FIG. 5B shows an embodiment where P-channel metal oxide semiconductor ("PMOS") transistors are employed in the pixel circuit CC, but not being limited thereto or thereby. According to an alternative embodiment, the pixel circuit CC may be implemented by N-channel metal oxide semiconductor ("NMOS") transistors. According to another alternative embodiment, the pixel circuit CC may be implemented by a combination of NMOS transistors and PMOS transistors.

In an embodiment, although not shown in FIG. 5A, the display layer 110 may further include a power pattern disposed in the non-display area NDA. In such an embodiment, the power pattern may be connected to a plurality of power lines PL. As the display layer 110 may include the power pattern, the pixels PX may receive a same first power supply signal as each other.

The display pads PDD may include a first pad D1 and a second pad D2. The first pad D1 may be provided in plural, and the first pads D1 may be respectively connected to the data lines DL. The second pad D2 may be connected to the power pattern to be electrically connected to the power line PL.

The display layer 110 may apply the electrical signals, which are provided from the outside through the display pads PDD, to the pixels PX. In an embodiment, the display pads PDD may further include pads to receive other electrical signals in addition to the first and second pads D1 and D2, and the display pads PDD may not be limited to a particular embodiment.

In an embodiment, the display layer 110 may further include sensing pads TDD. The sensing pads TDD may be arranged in the first direction DR1 and may be spaced apart from each other with the display pads PDD interposed therebetween. The sensing pads TDD may extend from a first contact hole CNT1. The first contact hole CNT1 may overlap a second contact hole CNT2 of the sensor layer 120.

A plurality of trace lines TL1, TL2, and TL3 (refer to FIG. 6) may be connected to the sensing pads TDD via the contact holes CNT1 and CNT2. Accordingly, a circuit board attached to the display layer 110 and a circuit board attached to the sensor layer 120 may be in contact with each other on the display layer 110.

In an embodiment, although not shown in figures, an area where the display pads PDD and the sensing pads TDD are disposed in the non-display area NDA of the display layer 110, may be bent with respect to an axis extending in the first direction DR1. Accordingly, the circuit board attached to the display pads PDD and the sensing pads TDD may be disposed under the display module 100.

Referring to FIG. 6, the sensor layer 120 may be disposed on the display layer 110. The sensor layer 120 may be coupled with the display layer 110 by a separate adhesive layer, but not being limited thereto or thereby. According to an embodiment, the sensor layer 120 may be formed directly on the display layer 110 through successive processes, but not being particularly limited.

The sensor layer 120 may include a first sensing electrode TE1, a second sensing electrode TE2, and the trace lines TL1, TL2, and TL3. The sensor layer 120 may include a sensing area SA and a non-sensing area NSA. The non-sensing area NSA may surround the sensing area SA. The sensing area SA may be a sensing area in which the input provided from the outside is sensed. The sensing area SA may overlap the display area DA of the display layer 110.

The sensor layer 120 may sense the external input using a self-capacitance method or a mutual capacitance method. The first sensing electrode TE1 and the second sensing electrode TE2 may be variously modified, arranged, and connected according to the self-capacitance method or the mutual capacitance method.

The first sensing electrode TE1 may include first sensing patterns SP1 and first bridge patterns BP1. The first sensing electrode TE1 may extend in the first direction DR1. The first sensing electrode TE1 may be provided in plural, and the first sensing electrodes TE1 may be arranged in the second direction DR2.

The first sensing patterns SP1 included in one first sensing electrode TE1 may be arranged spaced apart from each other in the first direction DR1. At least one first bridge pattern BP1 may be disposed between two first sensing patterns SP1 adjacent to each other.

The second sensing electrode TE2 may include second sensing patterns SP2 and second bridge patterns BP2. The second sensing electrode TE2 may extend in the second direction DR2. The second sensing electrode TE2 may be provided in plural, and the second sensing electrodes TE2 may be arranged in the first direction DR1.

The second sensing patterns SP2 included in one second sensing electrode TE2 may be arranged spaced apart from each other in the second direction DR2. At least one second bridge pattern BP2 may be disposed between two second sensing patterns SP2 adjacent to each other.

The trace lines TL1, TL2, and TL3 may be arranged in the non-sensing area NSA. The trace lines TL1, TL2, and TL3 may include a first trace line TL1, a second trace line TL2, and a third trace line TL3.

The first trace line TL1 may be connected to one end of the first sensing electrode TE1. The second trace line TL2 may be connected to one end of the second sensing electrode TE2. The third trace line TL3 may be connected to the other end of the second sensing electrode TE2. The other end of the second sensing electrode TE2 may be opposite to the one end of the second sensing electrode TE2.

According to an embodiment of the disclosure, the second sensing electrode TE2 may be connected to the second trace line TL2 and the third trace line TL3. Accordingly, a sensitivity with respect to areas of the second sensing electrode TE2 having a relatively longer length than that of the first sensing electrode TE1 may be uniformly maintained, but not being limited thereto. Alternatively, the third trace line TL3 may be omitted, and the first, second, and third trace lines TL1, TL2, and TL3 may not be particularly limited.

According to an embodiment, the sensor layer 120 may be provided with the second contact hole CNT2 defined therethrough. The second contact hole CNT2 may overlap the first contact hole CNT1 of the display layer 110. Each of the trace lines TL1, TL2, and TL3 may extend to a corresponding second contact hole CNT2. The first contact hole CNT1 and the second contact hole CNT2 may be filled with a conductive material. Accordingly, the trace lines TL1, TL2, and TL3 may be connected to corresponding sensing pads TDD via the contact holes CNT1 and CNT2.

Figure 7:
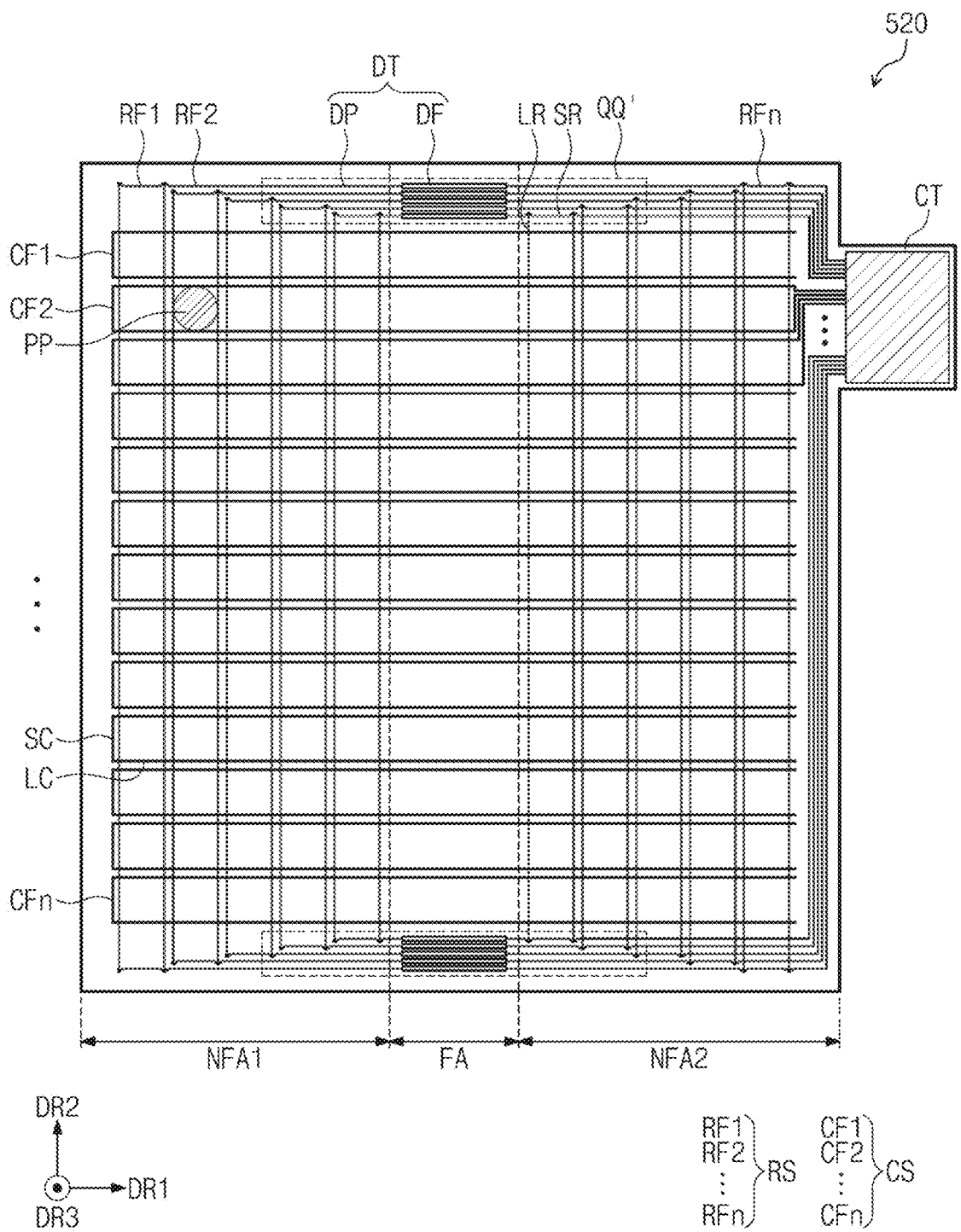
FIG. 7 is a plan view of a sensor according to an embodiment of the disclosure.
Figure 8A:
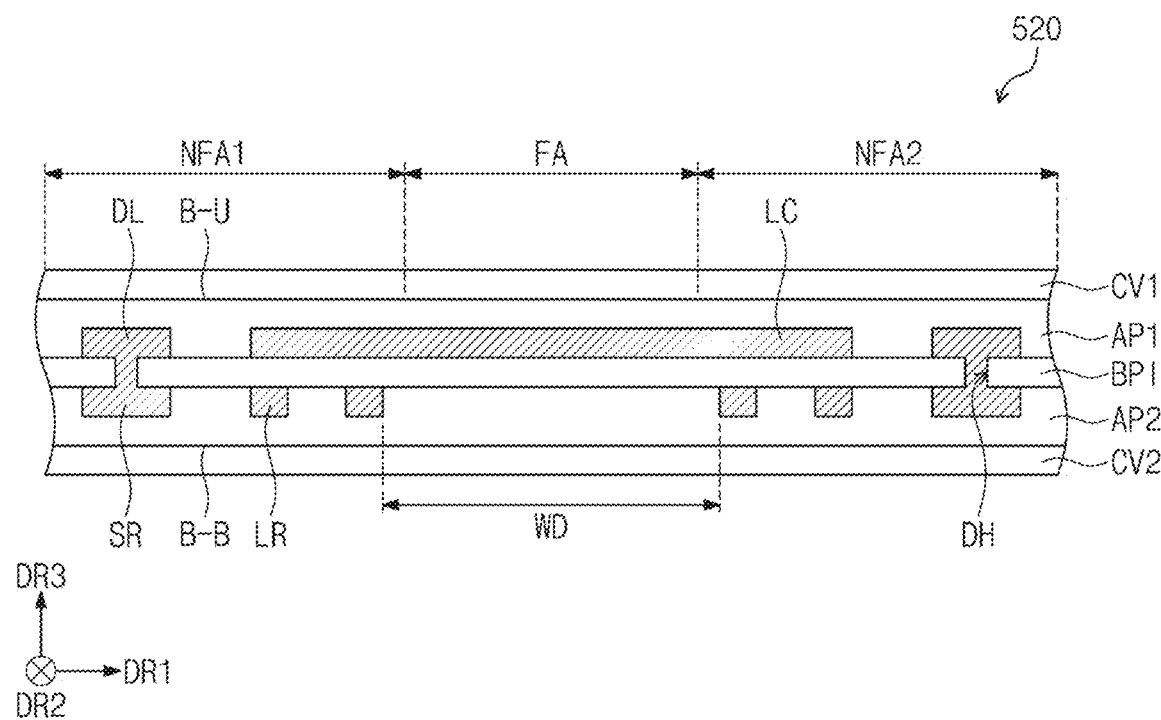
FIG. 8A is a cross-sectional view of a sensor according to an embodiment of the disclosure.
Figure 8B:
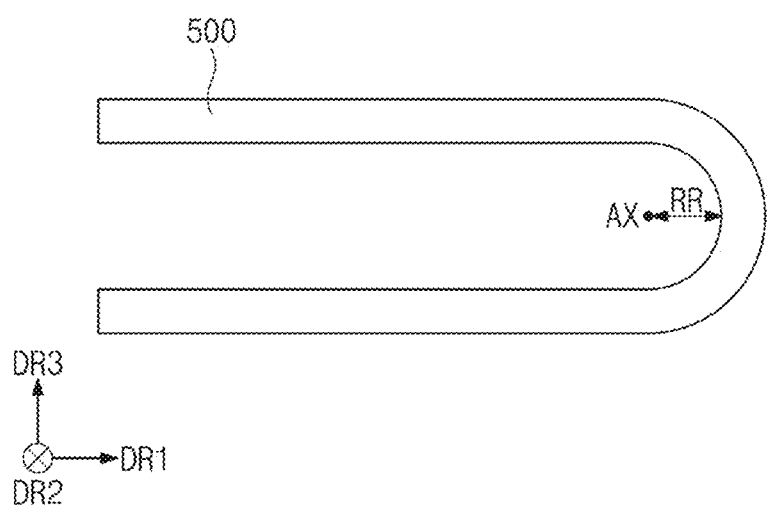
FIG. 8B is a cross-sectional view of a folded sensor according to an embodiment of the disclosure.
Figure 9:
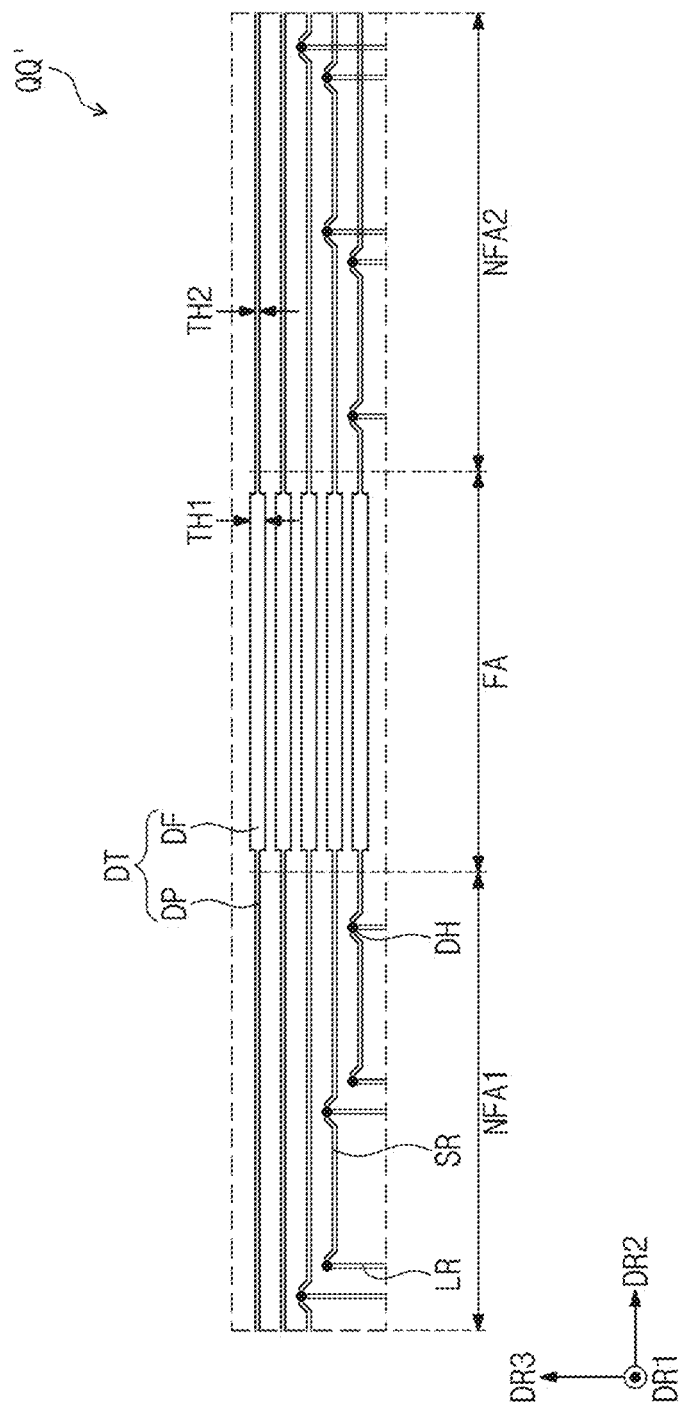
FIG. 9 is an enlarged cross-sectional view of an area QQ' of FIG. 7.
Figure 10:
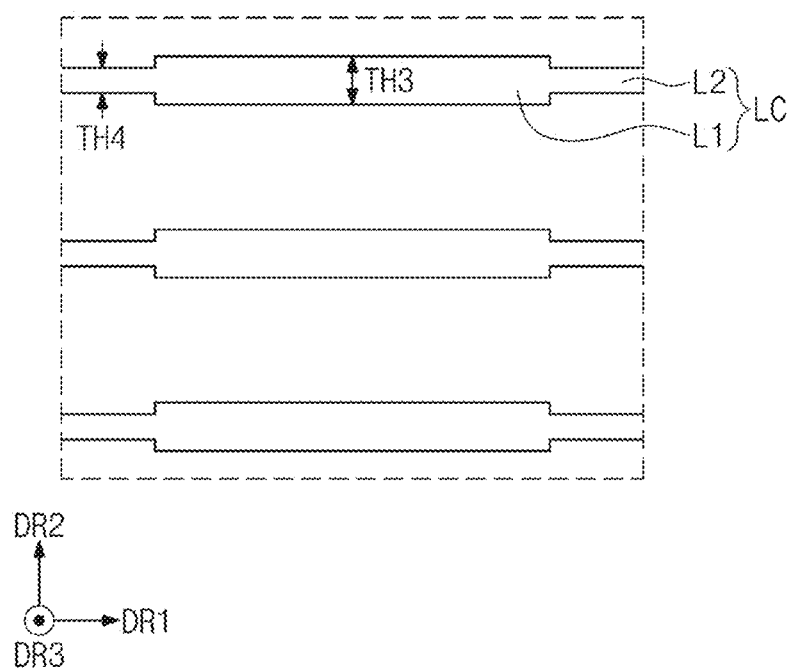
FIG. 10 is a plan view of a sensing coil overlapping a folding area according to an embodiment of the disclosure.

FIG. 7 is a plan view of the sensor according to an embodiment of the disclosure. FIG. 8A is a cross-sectional view of the sensor according to an embodiment of the disclosure. FIG. 8B is a cross-sectional view of a folded sensor according to an embodiment of the disclosure. FIG. 9 is an enlarged cross-sectional view of an area QQ' of FIG. 7. FIG. 10 is a plan view of a sensing coil overlapping a folding area according to an embodiment of the disclosure.

Referring to FIGS. 7 and 8A, in an embodiment, the digitizer 520 of the sensor 500 may sense the external input using the EMR method. The digitizer 520 may include digitizer sensors CS and RS and a connector CT. The digitizer sensors CS and RS may include a plurality of sensing coils spaced apart from each other with a base layer BPI interposed therebetween.

In an embodiment, as shown in FIG. 8A, the digitizer 520 may include a base layer BPI, a first adhesive layer AP1 disposed on a front surface B-U of the base layer BPI, a first cover layer CV1 disposed on the first adhesive layer AP1, a second adhesive layer AP2 disposed on a rear surface B-B of the base layer BPI, and a second cover layer CV2 disposed on the second adhesive layer AP2.

The connector CT may be connected to the sensing coils extending from the digitizer sensors CS and RS and may be connected to a mother board.

The base layer BPI may be a base layer on which the digitizer sensors CS and RS are disposed. The base layer BPI may include an organic material. In an embodiment, for example, the base layer BPI may include polyimide ("PI"). The base layer BPI may be provided with a hole DH defined therethrough.

A first digitizer sensor CS may include a plurality of first sensing coils CF1 to CFn, and a second digitizer sensor RS may include a plurality of second sensing coils RF1 to RFn.

Each of the first sensing coils CF1 to CFn may include a long side LC extending in the first direction DR1 and a short side SC extending in the second direction DR2.

Each of the second sensing coils RF1 to RFn may include a long side LR extending in the second direction DR2 and a short side SR extending in the first direction DR1.

Data lines DT may include a first pattern DF overlapping the folding area FA and a second pattern DP overlapping the non-folding areas NFA1, NFA2. The data lines DT may be disposed in a layer different from a layer in which the second sensing coils RF1 to RFn are disposed and may connect corresponding second sensing coils RF1 to RFn.

According to an embodiment, the first sensing coils CF1 to CFn and the data lines DT may be disposed on the front surface B-U of the base layer PBI, which is disposed adjacent to the display module 100, and the second sensing coils RF1 to RFn may be connected to the rear surface B-B of the base layer BPI, which faces the front surface.

In such an embodiment, the first sensing coils CF1 to CFn may be covered by the first adhesive layer AP1, and the second sensing coils RF1 to RFn may be covered by the second adhesive layer AP2. The adhesive layers AP1 and AP2 may include an epoxy-based material. The cover layers CV1 and CV2 may be disposed on the adhesive layers AP1 and AP2 to provide a flat surface and may protect the digitizer sensors CS and RS disposed on the base layer BPI. The cover layers CV1 and CV2 may include an organic material.

The first sensing coils CF1 to CFn may be directly connected to the connector CT, and the second sensing coils RF1 to RFn may be connected to the connector CT via the corresponding data lines DT.

The short side SR of each of the second sensing coils RF1 to RFn may be a portion of the corresponding second pattern DP of the data lines DT. In an embodiment, for example, the long side LR of one second sensing coil may be disposed on the rear surface B-B of the base layer BPI, and the short side SR of the one second sensing coil may be provided as a portion of the second pattern DP disposed on the front surface B-U of the base layer BPI and may be connected to an end of the long side LR via the hole DH.

The first digitizer sensor CS may correspond to the input coils of the sensor 500 operated in the EMR method, and the second digitizer sensor RS may correspond to the output coils of the sensor 500 operated in the EMR method.

The first sensing coils CF1 to CFn of the first digitizer sensor CS may receive scan signals activated in different periods from each other. Each of the second sensing coils RF1 to RFn of the second digitizer sensor RS may generate a magnetic field in response to a corresponding scan signal among the scan signals.

When the pen SP (refer to FIG. 1A) approaches the first sensing coils CF1 to CFn, the magnetic field induced by the first sensing coils CF1 to CFn may be resonated with a resonant circuit of the pen SP, and the pen SP may generate a resonant frequency. In such an embodiment, the pen SP may include an LC resonant circuit including an inductor and a capacitor.

The second sensing coils RF1 to RFn may output sensing signals according to the resonant frequency of the pen SP to the connector CT.

Referring to FIG. 7, a center of an area defined by a first-second sensing coil CF2 and a second-second sensing coil RF2 crossing the first-second sensing coil CF2 is referred to as an input point PP.

The sensing signal output from the first-second sensing coil CF2 among the first sensing coils CF1 to CFn may have a level higher than that of the sensing signals output from the other first sensing coils.

The sensing signal output from the second-second sensing coil RF2 among the second sensing coils RF1 to RFn may have a level higher than that of the sensing signals output from the other second sensing coils.

The sensing signals output from a second-first sensing coil RF1 and a second-third sensing coil RF3 among the second sensing coils RF1 to RFn may have a level lower than that of the sensing signal output from the second-second sensing coil RF2, and the sensing signals output from the second-first sensing coil RF1 and the second-third sensing coil RF3 among the second sensing coils RF1 to RFn may have a level higher than that of the sensing signals output from the other second sensing coils except the second-second sensing coil RF2.

Two-dimensional coordinate information of the input point PP by the pen SP may be obtained based on a detection time of the sensing signal output from the second-second sensing coil RF2 with the high level and a relative position of the second-second sensing coil RF2 with respect to the second sensing coils.

According to an embodiment, the second sensing coils RF1 to RFn may not overlap the folding area FA and may overlap the non-folding areas NFA1 and NFA2. Accordingly, only the long side LC of each of the first sensing coils CF1 to CFn among the sensing coils may cross the folding area FA.

In such an embodiment, the second sensing coils RF1 to RFn including the long side LR extending in a same direction as the folding axis AX1 (refer to FIG. 1B) are disposed not to overlap the folding area FA, such that cracks occurring in the second sensing coils RF1 to RFn in the folding area FA may be reduced in the digitizer 520.

Referring to FIG. 8A, a separation distance WD in the first direction DR1 between the second sensing coils (long sides) which are disposed nearest to the folding area FA among the second sensing coils RF1 to RFn may be equal to or smaller than about 10 μm. In a case where the separation distance WD between the second sensing coils (long sides) is greater than about 10 μm, the sensing signal output in the area overlapping the folding area FA may be weak.

According to an embodiment, a width in the first direction DR1 of the area, which is provided with the openings OP, of the support layer 610 may be greater than the separation distance WD between the second sensing coils (long sides).

Referring to FIG. 8B, when the sensor 500 is folded about a folding axis AX extending in the second direction DR2, a radius of curvature RR that is defined as a separation distance between the folding axis AX and the rear surface of the sensor 500 may be defined.

According to an embodiment, the radius of curvature RR may be equal to or greater than about 1.5 millimeters (mm) and equal to or smaller than about 5 mm. In such an embodiment, the separation distance WD between the second sensing coils (long sides) may be two times greater than the radius of curvature RR and may be smaller than the width of the area, which is provided with the openings OP, of the support layer 610.

Referring to FIG. 9, each of the data lines DT may include the second pattern DP overlapping the non-folding areas NFA1 and NFA2 and the first pattern DF overlapping the folding area FA.

A first width TH1 in the second direction DR2 of the first pattern DF may be greater than a second width TH2 in the second direction DR2 of the second pattern DP. According to an embodiment, the first width TH1 may be two times greater than the second width TH2.

In an embodiment, the first width TH1 of the first pattern DF may increase as the radius of curvature RR described with reference to FIG. 8B decreases.

The second width TH2 of the second pattern DP may be equal to or greater than about 10 μm and equal to or smaller than about 300 μm. When the second width TH2 is smaller than about 10 μm, a defect in contact between the second pattern DP and the second sensing coils RF1 to RFn may occur, and when the second width TH2 is greater than about 300 μm, an additional space is required to place the second pattern DP, and defects visible to the user may occur.

According to an embodiment of the disclosure, the first width TH1 of the first pattern DF overlapping the folding area FA is greater than the second width TH2 of the second pattern DP overlapping the non-folding areas NFA1 and NFA2, such that the cracks, which are generated in the data lines DT overlapping the folding area FA when the second sensing coils RF1 to RFn form a loop with the data lines DT, may be reduced. Accordingly, the folding characteristics and the reliability of the sensor 500 of the electronic apparatus EA may be improved.

FIG. 10 shows the long side LC of the first sensing coils CF1 to CFn of FIG. 7.

According to an embodiment, the long side LC of the first sensing coils CF1 to CFn may include a first line L1 overlapping the folding area FA and a second line L2 overlapping the non-folding areas NFA1 and NFA2. In an embodiment, the first line L1 may have a straight line shape extending in the first direction DR1.

A third width TH3 of the first line L1 in the second direction DR2 may be greater than a fourth width TH4 of the second line L2 in the second direction DR2. The third width TH3 may be equal to or smaller than about 500 μm.

According to an embodiment of the disclosure, the third width TH3 of the first line L1 of the first sensing coils CF1 to CFn may be equal to or greater than the first width TH1 of the first pattern DF of the data lines DT. Accordingly, the third width TH3 of the first line L1 of the first sensing coils CF1 to CFn may be two times greater than the second width TH2 of the second pattern DP of the data lines DT.

Figure 11A:
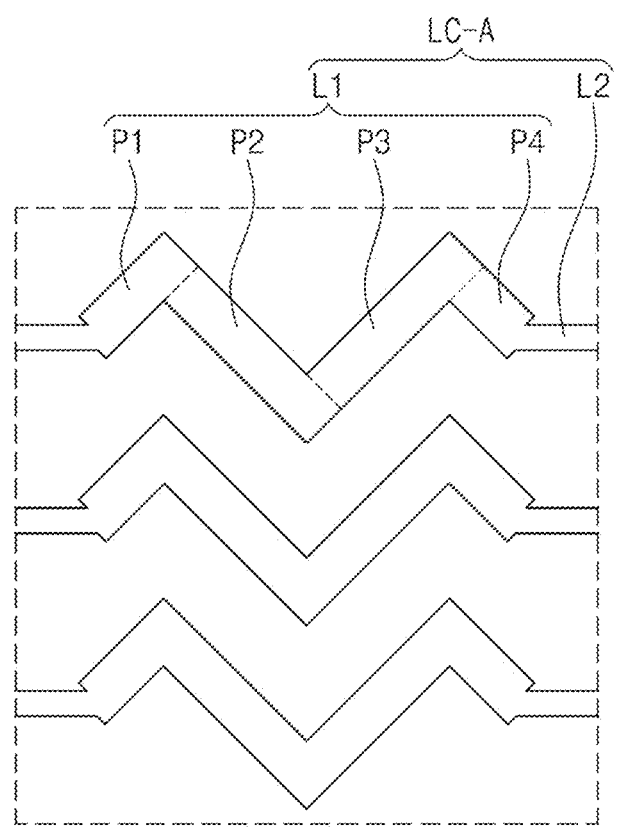
FIG. 11A is a plan view of a sensing coil overlapping a folding area according to an embodiment of the disclosure.
Figure 11A:
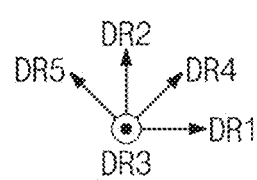
Figure 11B:
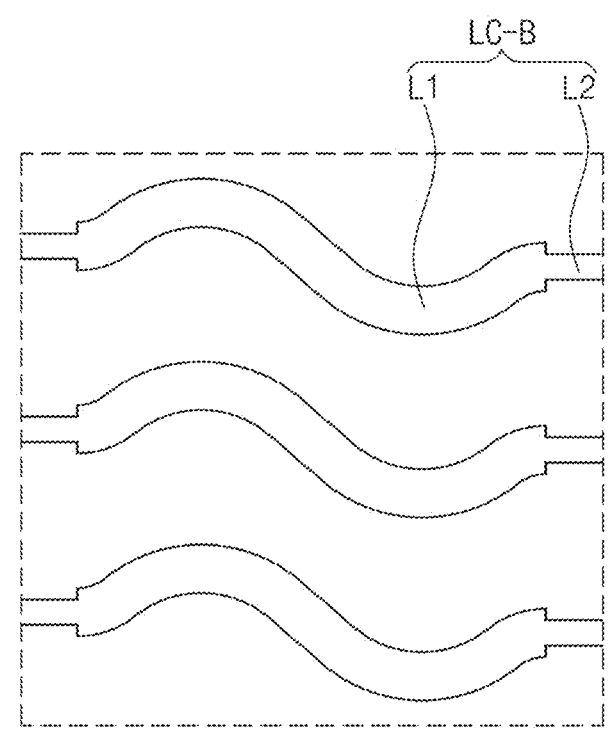
FIG. 11B is a plan view of a sensing coil overlapping a folding area according to an embodiment of the disclosure.
Figure 11B:
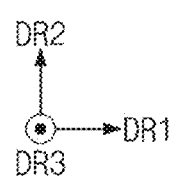

FIG. 11A is a plan view of a sensing coil overlapping a folding area according to an embodiment of the disclosure. FIG. 11B is a plan view of a sensing coil overlapping a folding area according to an embodiment of the disclosure. In FIGS. 11A and 11B, the same/similar reference numerals denote the same/similar elements in FIGS. 7 to 10, and thus, any repetitive detailed descriptions of the same/similar elements will be omitted or simplified.

Referring to FIG. 11A, in an embodiment, a long side LC-A of the first sensing coils CF1 to CFn (refer to FIG. 7) may include a first line L1 overlapping the folding area FA and a second line L2 overlapping the non-folding areas NFA1 and NFA2. In such an embodiment, the first line L1 may include a plurality of diagonal patterns P1, P2, P3, and P4 extending in a diagonal direction with respect to each of the first direction DR1 and the second direction DR2.

The first line L1 to may include a first pattern P1 and a third pattern P3, which extend in a fourth direction DR4, and a second pattern P2 and a fourth pattern P4, which extend in a fifth direction DR5.

The first pattern P1 may be connected between one end of the second line L2 and the second pattern P2, and the second pattern P2 may be connected between the first pattern P1 and the third pattern P3. The third pattern P3 may be connected between the second pattern P2 and the fourth pattern P4, and the fourth pattern P4 may be connected between the third pattern P3 and the other end of the second line L2.

According to the embodiment, the first sensing coils CF1 to CFn overlapping the folding area FA have a zigzag pattern shape, such that a stress of the second sensing coils RF1 to RFn overlapping the folding area FA may be dispersed when the electronic apparatus EA is folded, and thus, the occurrence of the cracks may be prevented.

Referring to FIG. 11B, in an alternative embodiment, a long side LC-B of the first sensing coils CF1 to CFn (refer to FIG. 7) may include a first line L1 overlapping the folding area FA and a second line L2 overlapping the non-folding areas NFA1 and NFA2. In such an embodiment, the first line L1 may have a wave shape extending in the first direction DR1.

According to an embodiment, the first sensing coils CF1 to CFn overlapping the folding area FA have the wave shape, e.g., a wave pattern, such that a stress of the first sensing coils CF1 to CFn overlapping the folding area FA may be dispersed when the electronic apparatus EA is folded, and thus, the occurrence of the cracks may be prevented.

Figure 12:
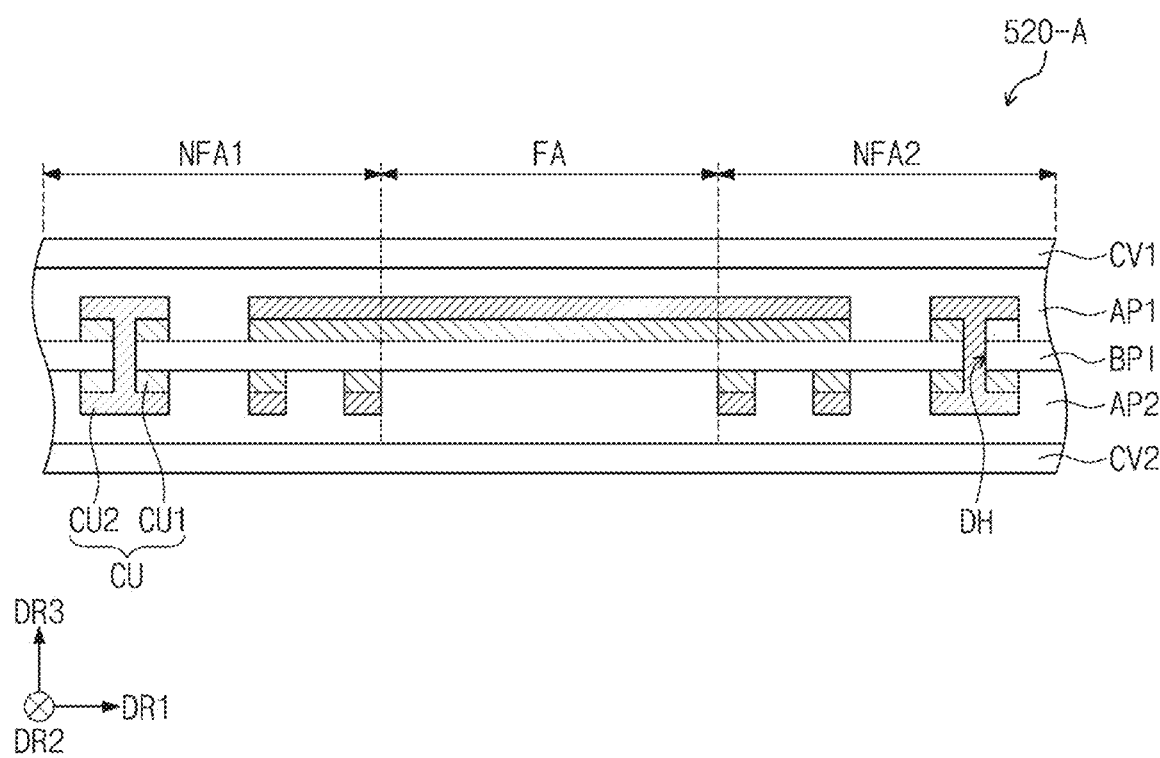
FIG. 12 is a cross-sectional view of a sensor according to an embodiment of the disclosure.

FIG. 12 is a cross-sectional view of a sensor according to an embodiment of the disclosure. FIG. 12 shows a cross-section of an area corresponding to FIG. 8A, and thus, different features from the sensor of FIG. 8A will be mainly described.

Referring to FIG. 12, each of sensing coils included in a digitizer 520-A may be provided as a metal layer CU having a multi-layer structure. In an embodiment, for example, the metal layer CU may include a first layer CU1 adjacent to a base layer BPI and a second layer CU2 disposed on the first layer CU1.

Each of the first layer CU1 and the second layer CU2 may include a metal material. In an embodiment, for example, the first layer CU1 and the second layer CU2 may include a same metal material as each other.

The first layer CU1 may be a metal layer on which a lamination process is performed, and the second layer CU2 may be a metal layer on which a plating process is performed. According to an embodiment, the metal material included in the first layer CU1 and the second layer CU2 may be copper.

A second pattern DP of data lines DT and second sensing coils RF1 to RFn may be connected to each other by the second layer CU2 penetrating through the first layer CU1 and the base layer BPI.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic apparatus comprising:
a display layer comprising non-folding areas arranged in a first direction and a folding area defined between the non-folding areas and foldable with respect to an imaginary folding axis extending in a second direction crossing the first direction;
a digitizer disposed under the display layer, wherein the digitizer comprises first sensing coils, second sensing coils insulated from the first sensing coils, and data lines connected to the second sensing coils; and
a support layer disposed under the digitizer, wherein a plurality of openings is defined in a portion of the support layer overlapping the folding area,
wherein
each of the first sensing coils comprises a long side extending in the first direction and a short side extending in the second direction,
each of the second sensing coils comprises a long side extending in the second direction and a short side extending in the first direction, and
a first width in the second direction of a portion of the data lines overlapping the folding area is greater than a second width in the second direction of a portion of the data lines not overlapping the folding area.

2. The electronic apparatus of claim 1, wherein the first width is two times greater than the second width.

3. The electronic apparatus of claim 2, wherein the second width is equal to or greater than about 10 micrometers and equal to or smaller than about 300 micrometers.

4. The electronic apparatus of claim 1, wherein a radius of curvature defined between the folding axis and a rear surface of the digitizer is equal to or greater than about 1.5 millimeters and equal to or equal to or smaller than about 5 millimeters when the electronic apparatus is folded with respect to the folding axis.

5. The electronic apparatus of claim 4, wherein the first width increases as the radius of curvature decreases.

6. The electronic apparatus of claim 1, wherein
the short side of each of the first sensing coils and the second sensing coils are spaced apart from the folding area, and
the long side of each of the first sensing coils overlaps the folding area.

7. The electronic apparatus of claim 6, wherein a separation distance between long sides nearest to the folding area among long sides of the second sensing coils is equal to or smaller than about 10 micrometers.

8. The electronic apparatus of claim 7, wherein a width in the second direction of the portion of the support layer in which the openings are defined is greater than the separation distance.

9. The electronic apparatus of claim 8, wherein the width in the second direction of the portion of the support layer in which the openings are defined is two times greater than a radius of curvature defined between the folding axis and a rear surface of the digitizer when the electronic apparatus is folded with respect to the folding axis.

10. The electronic apparatus of claim 6, wherein the long side of the first sensing coils overlapping the folding area has a width equal to or smaller than about 500 micrometers in the second direction.

11. The electronic apparatus of claim 1, wherein the long side of the first sensing coils overlapping the folding area has a wave shape.

12. The electronic apparatus of claim 1, wherein the long side of the first sensing coils overlapping the folding area comprises a plurality of diagonal patterns extending in a diagonal direction with respect to the first direction and the second direction.

13. The electronic apparatus of claim 1, wherein the digitizer comprises:
a base layer comprising a front surface on which the first sensing coils and the data lines are disposed and a rear surface on which the second sensing coils are disposed;
a first cover layer disposed on the front surface; and
a second cover layer disposed on the rear surface,
wherein
the data lines are connected to the second sensing coils via a hole defined through the base layer,
the front surface is disposed adjacent to the display layer, and
the rear surface is opposite to the front surface.

14. The electronic apparatus of claim 1, further comprising:
a shielding layer disposed between the digitizer and the support layer.

15. The electronic apparatus of claim 1, further comprising:
a window disposed on the display layer; and
an optical film disposed between the window and the display layer.

16. An electronic apparatus comprising:
a display layer comprising non-folding areas arranged in a first direction and a folding area defined between the non-folding areas and foldable at a predetermined radius of curvature with respect to an imaginary folding axis extending in a second direction crossing the first direction;
a digitizer disposed under the display layer, wherein the digitizer comprises first sensing coils, second sensing coils insulated from the first sensing coils, and data lines connected to the second sensing coils; and
a support layer disposed under the digitizer, wherein a plurality of openings is defined in a portion of the support layer overlapping the folding area,
wherein
the second sensing coils are spaced apart from the folding area, and
a first width in the second direction of a portion of the data lines overlapping the folding area is smaller than a second width in the second direction of a portion of the first sensing coils overlapping the folding area.

17. The electronic apparatus of claim 16, wherein
the first width is two times greater than a third width in the second direction of a portion of the data lines overlapping the non-folding areas, and
the third width is equal to or greater than about 10 micrometers and equal to or smaller than about 300 micrometers.

18. The electronic apparatus of claim 17, wherein the second width is equal to or smaller than about 500 micrometers.

19. The electronic apparatus of claim 16, wherein a separation distance between long sides nearest to the folding area among long sides of the second sensing coils is equal to or smaller than about 10 micrometers.

20. The electronic apparatus of claim 19, wherein a width in the second direction of the portion of the support layer in which the openings are defined is greater than the separation distance.

* * * * *